United States Patent [19]
Rokutan

[11] Patent Number: 5,425,010
[45] Date of Patent: Jun. 13, 1995

[54] OPTICAL INFORMATION RECORDING/REPRODUCING APPARATUS HAVING PHOTO DETECTING ELEMENT DISPOSED IN A TWO-DIMENSIONAL ARRAY

[75] Inventor: Takao Rokutan, Higashimurayama, Japan

[73] Assignee: Olympus Optical Co., Ltd., Tokyo, Japan

[21] Appl. No.: 271,260

[22] Filed: Jul. 7, 1994

Related U.S. Application Data

[63] Continuation of Ser. No. 969,942, Oct. 30, 1992, abandoned.

[30] Foreign Application Priority Data

Nov. 1, 1991 [JP] Japan .................................. 3-287905

[51] Int. Cl.$^6$ .................................................. G11B 7/00
[52] U.S. Cl. ............................... 369/44.11; 369/44.26; 369/44.41; 369/54
[58] Field of Search ................. 369/44.11, 32, 54, 124, 369/120, 44.41, 44.42, 44.27, 44.28, 44.29, 44.32, 44.26, 275.1–275.5

[56] References Cited

U.S. PATENT DOCUMENTS

| | | | |
|---|---|---|---|
| 4,224,480 | 9/1980 | Satoh et al. | 369/44.42 |
| 4,755,980 | 7/1988 | Yoshimaru et al. | 369/44.41 |
| 4,819,222 | 4/1989 | Kimura | 369/124 |
| 5,053,610 | 10/1991 | Horie | 369/44.41 |
| 5,101,096 | 3/1992 | Ohyama et al. | 369/275.3 |
| 5,155,718 | 10/1992 | Hashimoto et al. | 369/44.42 |
| 5,177,718 | 1/1993 | Takeuchi | 369/44.28 |
| 5,257,249 | 10/1993 | Rokutan | 369/44.26 |

OTHER PUBLICATIONS

Joit, vol. 3, No. 2/1988, pp. 32–38.

Primary Examiner—Georgia Y. Epps
Assistant Examiner—Nabil Hindi
Attorney, Agent, or Firm—Armstrong, Westerman, Hattori, McLeland & Naughton

[57] ABSTRACT

An optical information recording/reproducing apparatus for performing tracking servo and at least one of recording and reproducing information by irradiating a recording medium having a plurality of guide tracks and a plurality of information tracks with a light spot and by generating a track error signal from reflected light of the light spot. The apparatus includes a photo-detecting device having a detection portion composed of a plurality of light receiving portions which are disposed in a two-dimensional array, the detection portion receiving formed spot of light reflected by the recording medium so as to output a signal, an addition device for selecting a region having an arrangement of the plurality of light receiving portions in a line or column direction in the detection portion of the photo-detecting device and for adding together outputs from the arrangement of the light receiving portions in the selected regions, a binary coding device for binary-coding output from the addition device, an address detection device for detecting the position of an address which corresponds to the position of at least one guide tracks on the basis of output from the binary cording device, and a track error generating device for generating a track error signal on the basis of the output from the address detection device.

18 Claims, 22 Drawing Sheets

FIG.8
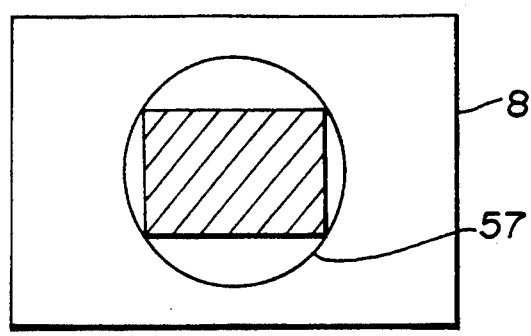
FIG.9(a)
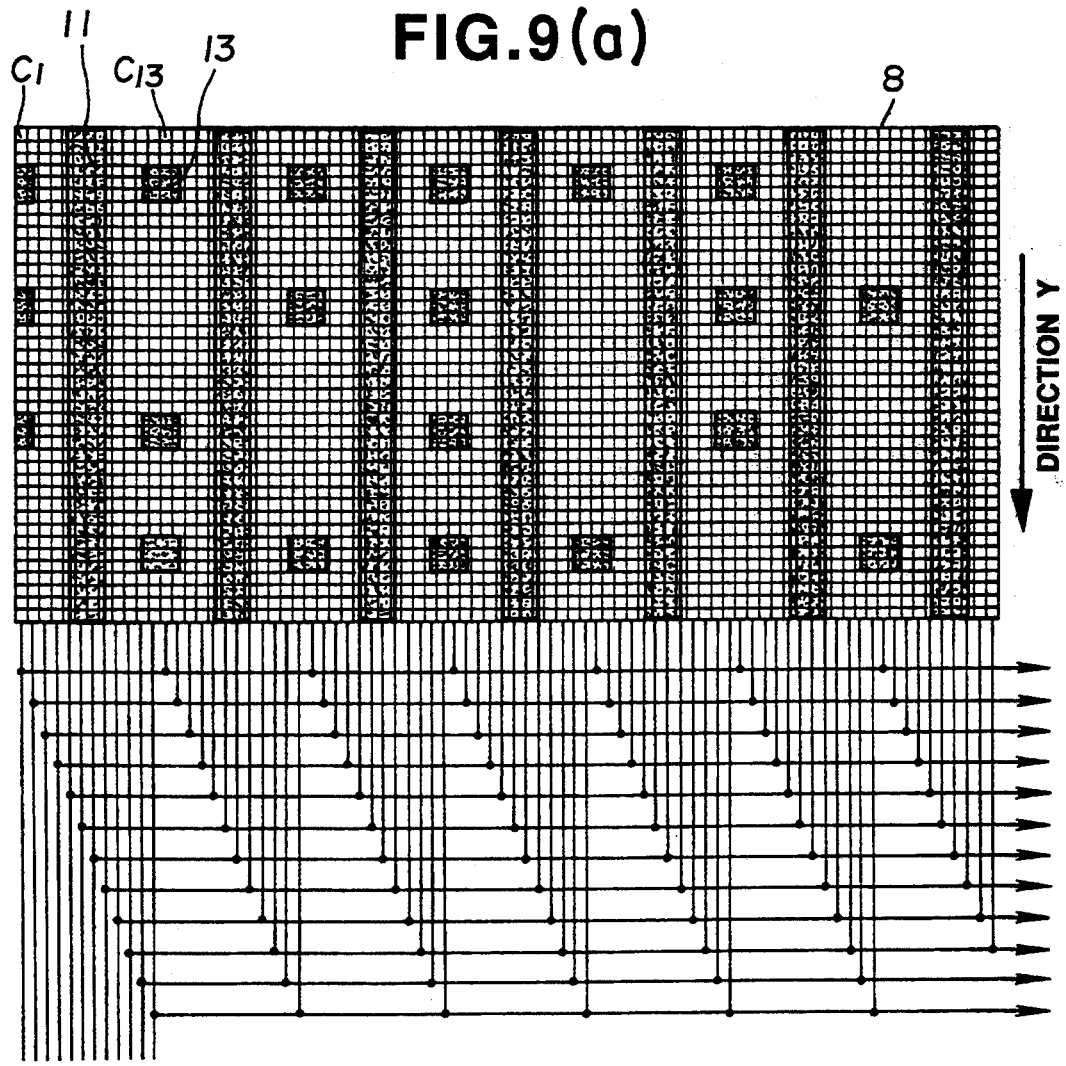
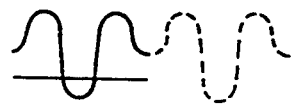  CMD OUT  FIG.9(b)
  BINARY SIGNAL  FIG.9(c)

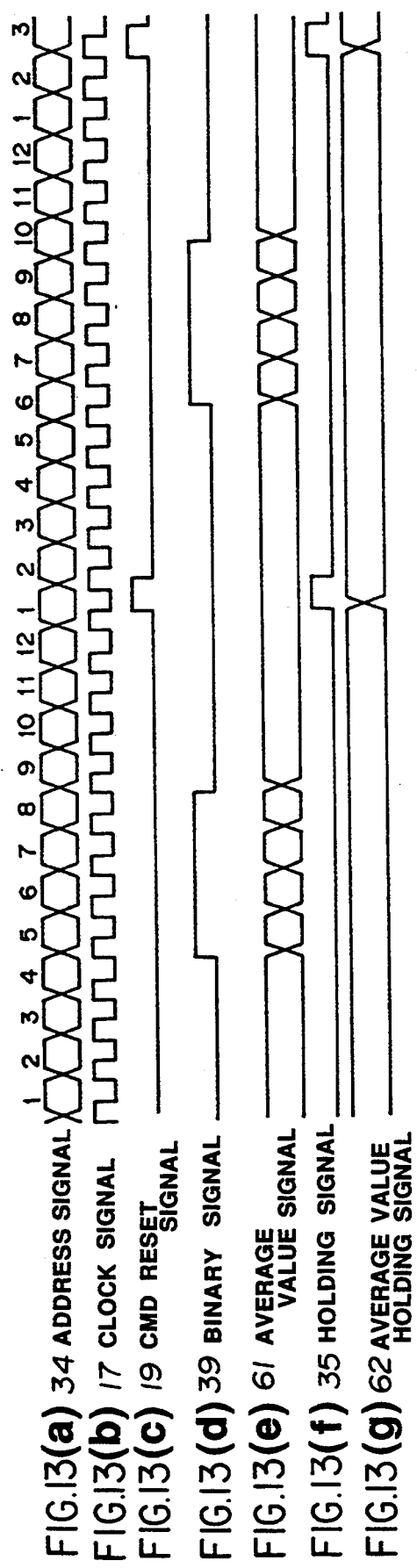

FIG.11(a)
FIG.11(b)
FIG.11(c)
FIG.11(d)
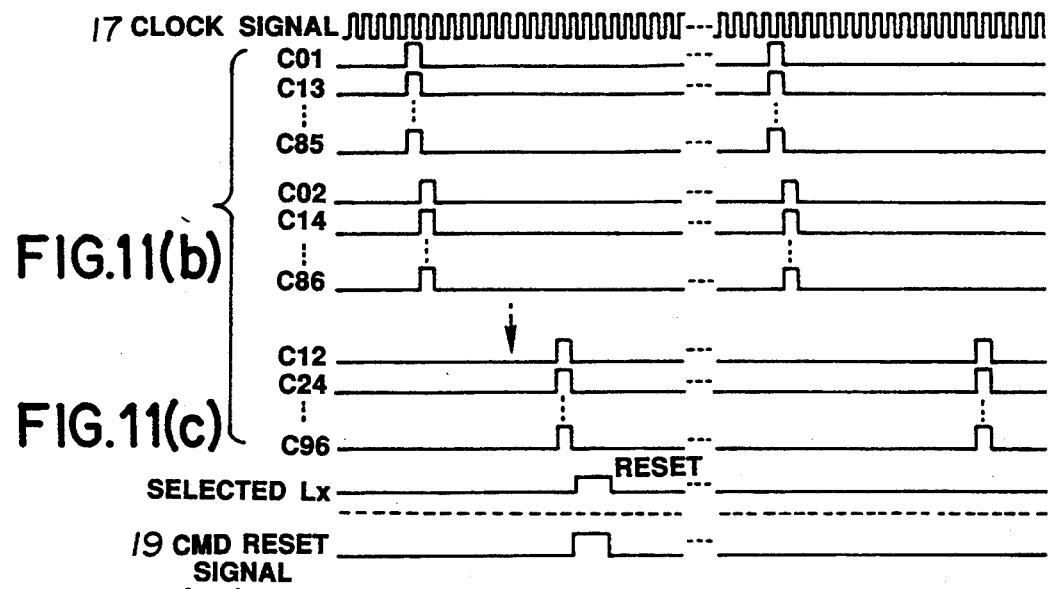
FIG.14
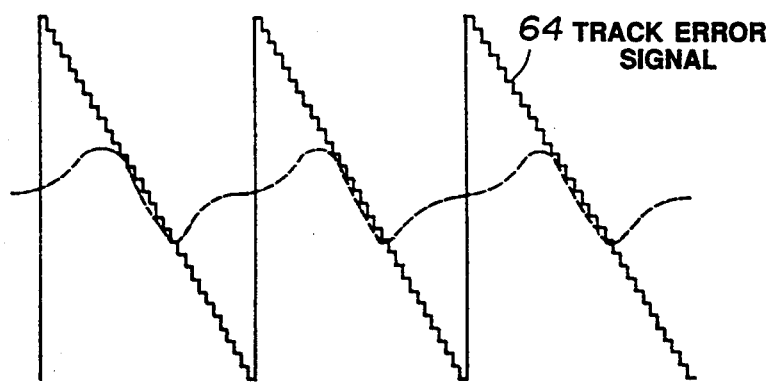
FIG.18
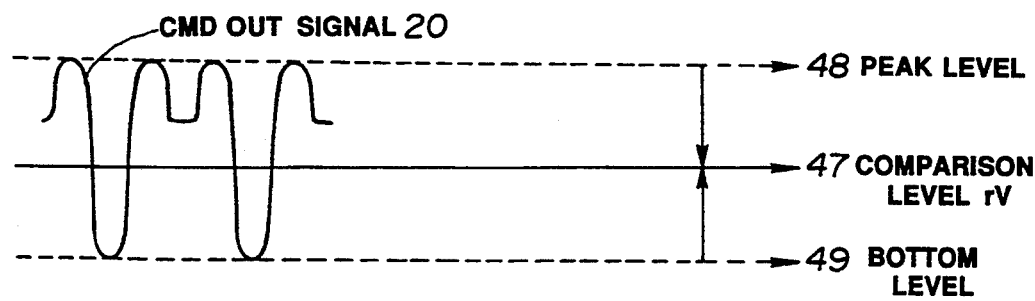

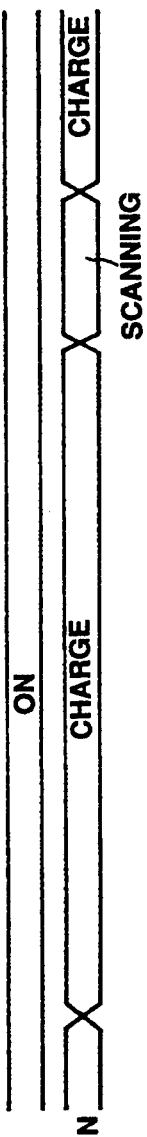

FIG.19(a)
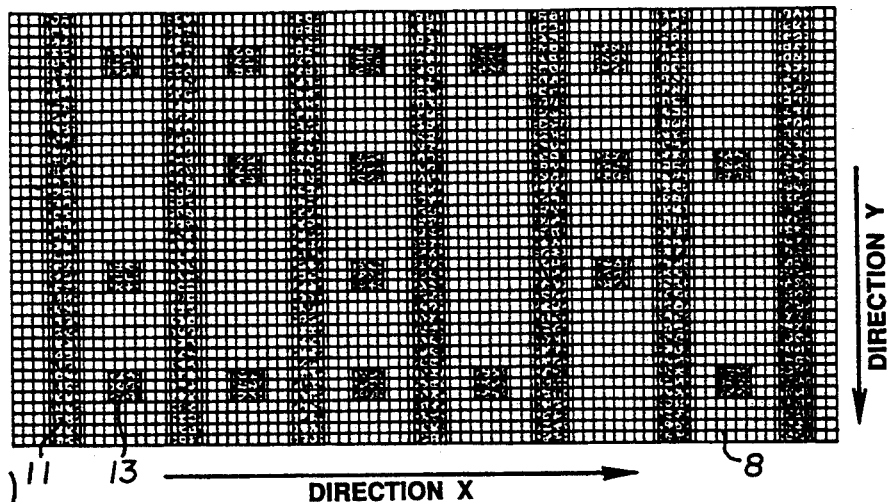
FIG.19(b)
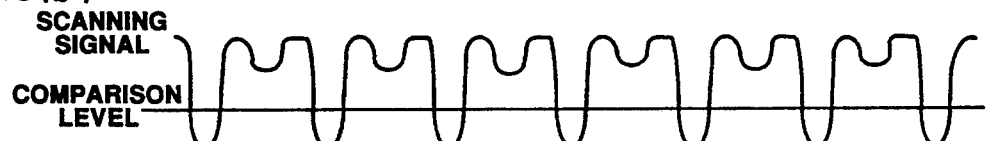
FIG.19(c)
FIG.20(a)
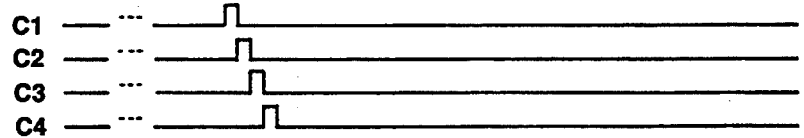
FIG.20(b)
FIG.20(c)
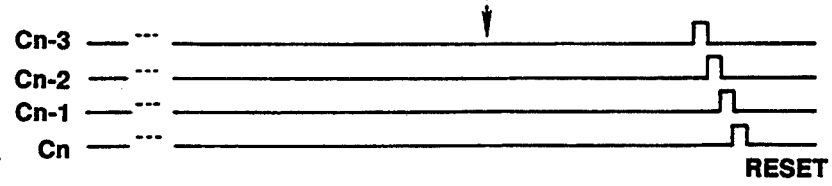
FIG.20(d)

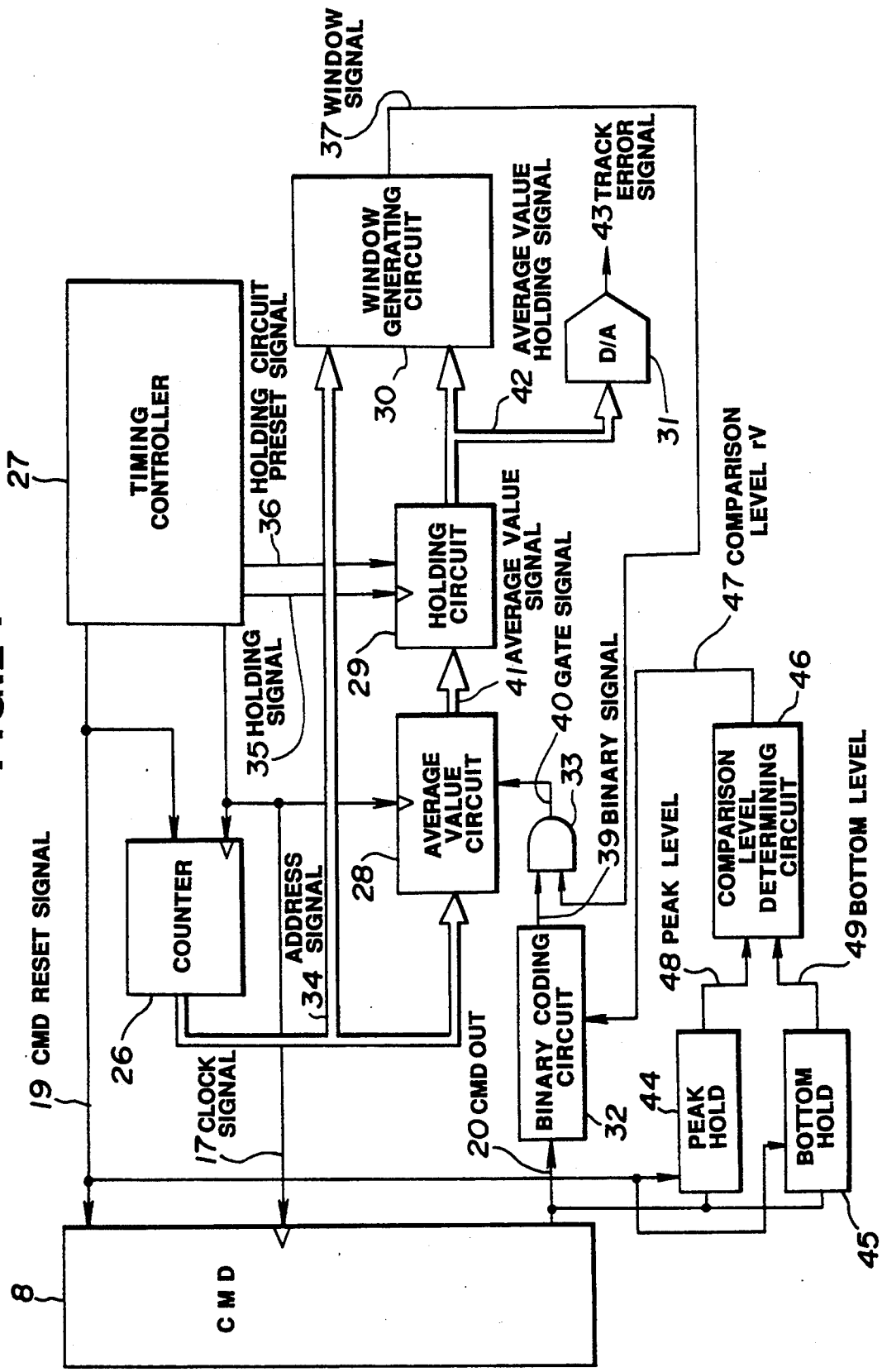

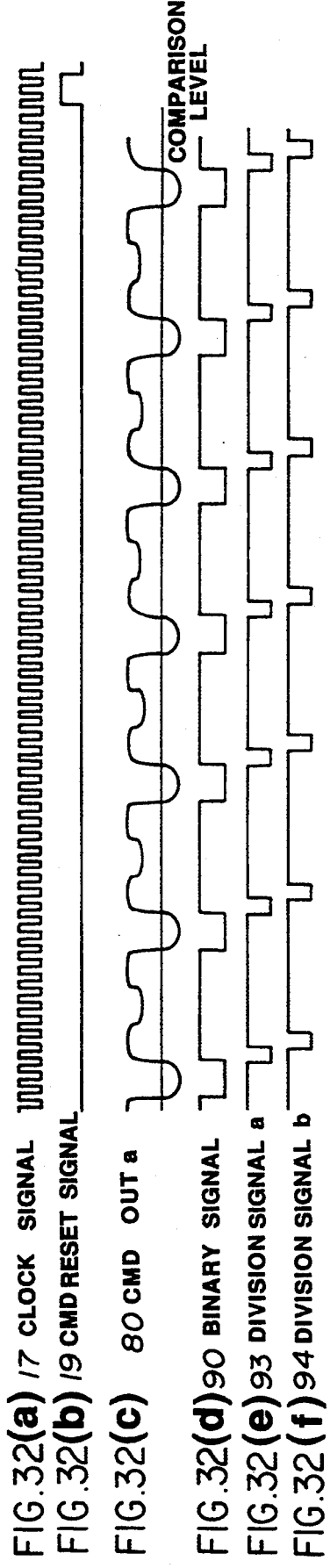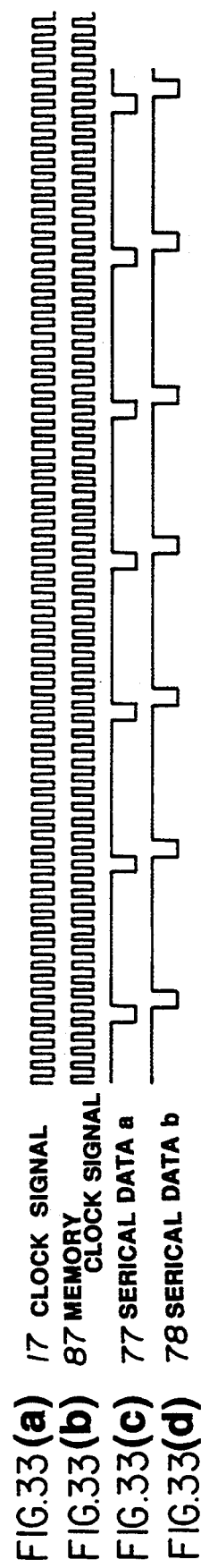

OPTICAL INFORMATION RECORDING/REPRODUCING APPARATUS HAVING PHOTO DETECTING ELEMENT DISPOSED IN A TWO-DIMENSIONAL ARRAY

This application is a continuation of application Ser. No. 07/969,942, filed Oct. 30, 1992, now abandoned.

BACKGROUND OF THE INVENTION

1. Field of the Invention

The present invention relates to an optical information recording/reproducing apparatus having an expanded range within which a track error signal can be detected.

2. Related Art Statement

Recently, optical information recording/reproducing apparatuses capable of serving as large-capacity recording apparatuses have attracted public attention as the information industry advances. These optical information recording/reproducing apparatuses are exemplified by an optical card apparatus for recording/reproducing information which uses an optical card as the recording medium. Although data cannot be reloaded to optical cards as it can to reloadable optical disks, optical cards are expected to be widely applied for bankbooks, handy maps, prepaid cards or the like for use in shopping and so on, since the optical card has a recording capacity which is a thousand to ten thousand times larger than the recording capacity of the magnetic card and has a large storage capacity of 1 to 2M bytes. Furthermore, the fact that data cannot be reloaded into the optical card enables it to be applied to an application such as a health care card which does not permit data to be re-written.

As shown in FIG. 1, an optical card comprises ID portions 15a and 15b on which information such as a track address is recorded and a data recording portion 16 for recording information. The data recording portion 16 has a plurality of guide tracks 11 and tracks 12 formed between the guide tracks 11, the guide tracks 11 being arranged to guide the light spot in the direction of the tracks 12. Each of the tracks 12 has data pits 13 for recording/reproducing information.

When information recorded/reproduced in the data pits 13 of the track 12 is recorded/reproduced by means of light spots, accurate tracking servo must be performed in order that the light spots accurately follow the tracks 12. The tracking servo is ordinarily performed in such a manner that a tracking error signal indicating the deviation of a light spot from the central portion of the track is generated, and means for converging the light spot onto the medium is driven in the direction of the track in accordance with the tracking error signal.

FIG. 2 illustrates the conventional structure of an optical system for detecting a track error signal.

Light beams emitted from a light emitting device 2 are shaped into parallel light beams by a collimeter lens 3, diffracted light beams are formed by a diffraction grating 50, and the light beams are focused on the surface of the optical card 1 by an objective lens 4.

The focused light beams are reflected by the card 1, these reflected light beams are again reflected by a mirror 5, and the light beams are made to be incident on a detector 52 by a detection-system lens 51.

FIG. 3 is an enlarged view of some optical beams applied to a focal point on the surface of an optical card 1. A beam 53 diffracted by the diffraction grating 50 called a "main beam" is used to record/reproduce data in the data pit 13 and to generate a focus error signal for the purpose of controlling focusing, while beams 54 and 55 called "sub-beams" are respectively disposed in such a way that half of each overlaps the guide track 11, and are used to generate track error signals.

FIG. 4 illustrates beams reflected by the optical card 1, where beams 53a, 54a and 55a correspond to beams 53, 54 and 55 shown in FIG. 3.

The detector 52 is further divided into sections 52a, 52b, 52c and 52d. If the beam on the optical card 1 deviates from the focused state, the beam 53a is moved in a direction perpendicular to the division lines of the detectors 52a and 52b. Therefore, a focus error signal denoting the deviation from the focus position can be obtained by calculating the difference between the output values of detectors 52a and 52b. By using the focus error signal to drive an objective lens 10 so that it approaches or moves away from the card, focusing control is performed for the purpose of always maintaining the focused state.

When the beams 53, 54 and 55 are moved in a direction perpendicular to the tracks 12, the degree to which the beams 54 and 55 overlap the guide track is changed. Therefore, by calculating the difference between the output values of the detector 52c and 52d, a track error signal indicating the deviation of the beam from the central portion of the track can be obtained. By using the track error signal to drive the objective lens 10 in a direction perpendicular to the tracks, tracking control is performed for the purpose of always maintaining the beam at the central portion of the track.

FIG. 5 illustrates the track error signal when the light spot is displaced in a transverse direction with respect to the track, the track error signal having a waveform the period of which is the width of the track.

However, the method of detecting the track error signal adapted to the aforesaid conventional apparatus encounters the following problems:

(1) The range in which the track error signal can be detected is narrow and therefore the apparatus cannot satisfactorily withstand vibrations and shock.

(2) The apparatus can easily be affected by dust or a defect such as a flaw in the card and therefore the apparatus cannot perform satisfactorily if such conditions are present.

As for problem (1), the range in which the track error signal can be detected is determined on the basis of the diameter of the beam spot and the width of the track in the aforesaid conventional method. Therefore, the detection range is ordinarily limited to the width of one track (2 to 3 μm).

Therefore, the track error signal can be swung considerably if an acceleration acts on the objective lens 10 due to external vibrations or shock, so as to exceed the linear portion of the track error signal which can be used as the signal. As a result, the tracking servo becomes unstable and deviates to another track.

As for problem (2), the track error signal can be swung excessively if either of the beams 54 and 55 shown in FIG. 3 has a defect.

Since a beam usually has a diameter of about 2 to 3 μm, the track error signal is critically affected by even a small defect. In this case, also the tracking servo becomes unstable and deviates to another track.

OBJECTS AND SUMMARY OF THE INVENTION

An object of the present invention is to provide an optical information recording/reproducing apparatus which is capable of considerably expanding the range in which a track error signal can be detected and in which a light spot can be controlled so as to follow a desired track even if the light spot deviates considerably from the desired track.

Another object of the present invention is to provide an optical information recording/reproducing apparatus which is capable of considerably widening the range in which a track error signal can be detected, so that deviation of the tracking servo is prevented and stable tracking servo can therefore be performed, free from the influence of defects in the medium or of external vibrations and shock.

Another object of the present invention is to provide an optical information recording/reproducing apparatus which is capable of accurately detecting the position of a portion of the guide track regardless of irregularity of the reflectance from the medium, or in the optical system, and of partial irregularity of the reflectance from the medium, and is therefore able to decrease error in the track error signal and thus is capable of performing more stable tracking servo.

Another object of the present invention is to provide an optical information recording/reproducing apparatus which is capable of generating a track error signal while following deviation in the position of the guide track from a designated position if such deviation takes place, and which is capable of performing stable tracking servo free from the influence of uneven distribution of the track intervals of the medium and that of magnification of the optical system.

The present invention is an optical information recording/reproducing apparatus for performing tracking servo and at least one of recording and reproducing information by irradiating with a light spot a recording medium having a plurality of guide tracks and a plurality of information tracks and by generating a track error signal from reflected light of the light spot. The optical information recording/reproducing apparatus comprises: photo-detecting means having a detection portion composed of a plurality of light receiving portions which are disposed in a two-dimensional array, the detection portion receiving a formed spot of light reflected by the recording medium so as to output a signal; addition means for selecting a region having an arrangement of the plurality of light receiving portions arranged in lines or columns within the detection portion of the photo-detecting means, and for adding together outputs from the arrangements of light receiving portions in the selected regions; binary coding means for binary-coding output from the addition means; address detection means for detecting the position of an address which corresponds to the position of at least one guide tracks on the basis of the output from the binary coding means; and track error generating means for generating a track error signal on the basis of the output from the address detection means.

The other objects, features and advantages of the invention will be more fully apparent from the following description.

BRIEF DESCRIPTION OF THE DRAWINGS

FIGS. 6 to 16 relate to a first embodiment of the present invention where

FIG. 6 illustrates the structure of an optical system;

FIG. 7 is a partially enlarged view which illustrates a state of a light beam falling on the recording surface of a medium on a CMD sensor;

FIG. 8 illustrates a region of the CMD sensor on which a light spot is formed;

FIGS. 9(a-c) illustrates the principle of generating a track error signal according to the first embodiment;

FIG. 10 is a block diagram which illustrates the structure of a selection/scanning circuit for adding/scanning cells of the CMD sensor;

FIGS. 11(a-d) is a time chart which illustrates the operation timing at the time of adding/scanning the cells;

FIG. 12 is a block diagram which illustrates the structure of an essential portion of the first embodiment;

FIGS. 13(a-g) is a time chart which illustrates the operations of the components at the time of generating a track error signal according to the first embodiment;

FIG. 14 illustrates the waveform of a track error signal obtainable in the first embodiment;

FIGS. 15(a-b) and 16(a-b) are time charts which illustrate the charging period and the operation of the light source during the scanning operation of the CMD sensor;

FIGS. 17 and 18 relate to a second embodiment of the present invention, where

FIG. 17 is a block diagram which illustrates the essential portion of the second embodiment;

FIG. 18 illustrates a comparison level used in a binary coding circuit;

FIGS. 19(a-c) to 23 relate to a third embodiment of the present invention, where FIG. 19 illustrates the principle of generating a track error signal according to the third embodiment;

FIG. 20(a-d) is a time chart which illustrates the operation timing at the time of adding/scanning the cells;

FIGS. 24 and 25 relate to a fourth embodiment of the present invention, where

FIG. 24 is a block diagram which illustrates an essential portion of the fourth embodiment;

FIG. 25 illustrates a comparison level used for the binary coding circuit;

FIG. 26 illustrates the principle of generating the track error signal according to the fifth embodiment;

FIG. 27 is a block diagram which illustrates the structure of a selection/scanning circuit for adding/scanning cells of the CMD sensor;

FIG. 28 is a block diagram which illustrates the structure of an essential portion of the fifth embodiment;

FIGS. 29(a-c) illustrates the waveforms showing a CMD difference signal and the track error signal;

FIGS. 32(a-f) and 33(a-d) are time charts which illustrate,the operations of the components when serial data a 77 and b 78 are obtained which specify the cell region to be selected and scanned by the CMD sensor shown in FIG. 30 at the time of generating the track error signal.

DETAILED DESCRIPTION OF THE PREFERRED EMBODIMENTS

FIGS. 6 to 16 illustrate a first embodiment of the present invention.

The first embodiment employs an area sensor serving as photo-detecting means instead of conventional simple detectors divided into several cells each having a relatively large area which have been used for detecting a trace error signal and composed of tens to hundreds of thousands of cells disposed two dimensionally.

There are a variety of ordinary area sensors such as CCD sensors, MOS sensors, CMD sensors, CMD sensors and the like. The CMD (Charge Modulation Device) sensor is used in the description hereinbelow.

The CMD sensor has been disclosed in "Gate-Storage type MOS Phototransistor Image Sensor", p 32 to 38, No. 11 (1987), Vol. 41, the Television Academic Society Magazine.

Figure 6:
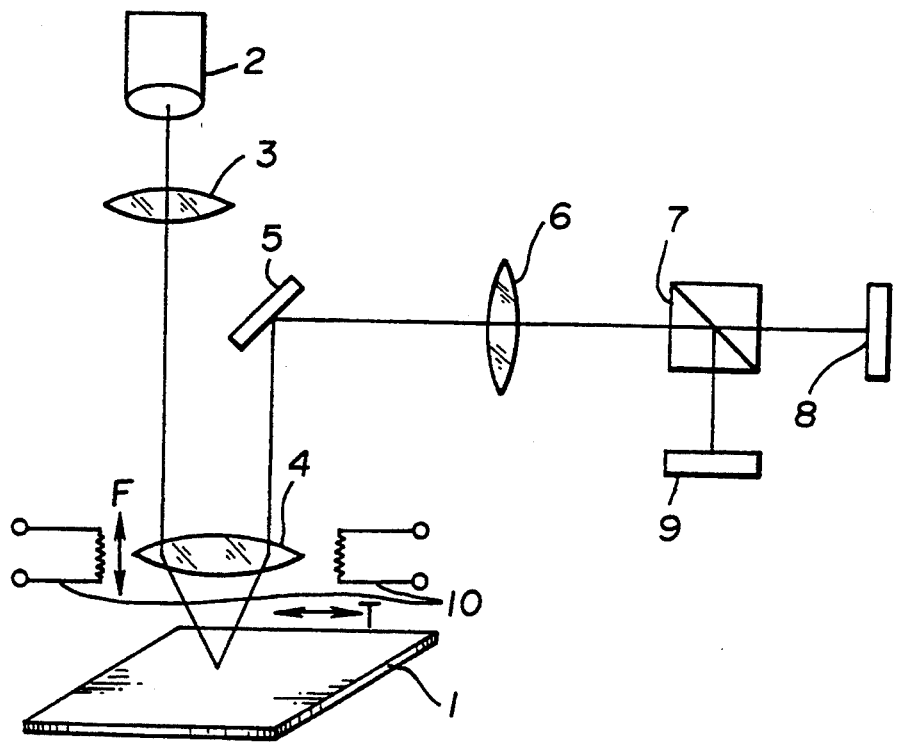

FIG. 6 illustrates the structure of an optical system used in this embodiment and acting to detect the track error signal.

In FIG. 6, light beams emitted from a light emitting device 2 pass through a collimeter lens 3, and they are converged by an objective lens 4, so that an optical card 1 is irradiated with the converged light beams. Then, reflected light beams are further reflected by a mirror 5, allowed to pass through an imaging lens 6, and divided into two portions by a beam splitter 7. Either of the portions is incident on a CMD sensor 8 for generating a track error signal and a data signal, while the residual portion is incident on a focusing detector 9.

The objective lens 4 can be moved in focusing directions (the vertical direction of FIG. 6) F and track transversal directions T by an objective lens drive portion 10. The objective lens drive portion 10 is driven by a servo signal on the basis of a focus error signal and a track error signal. An optical head having the optical system shown in FIG. 6 can be moved, for example, in the track transversal direction T by a head sending mechanism (omitted from illustration).

Figure 1:
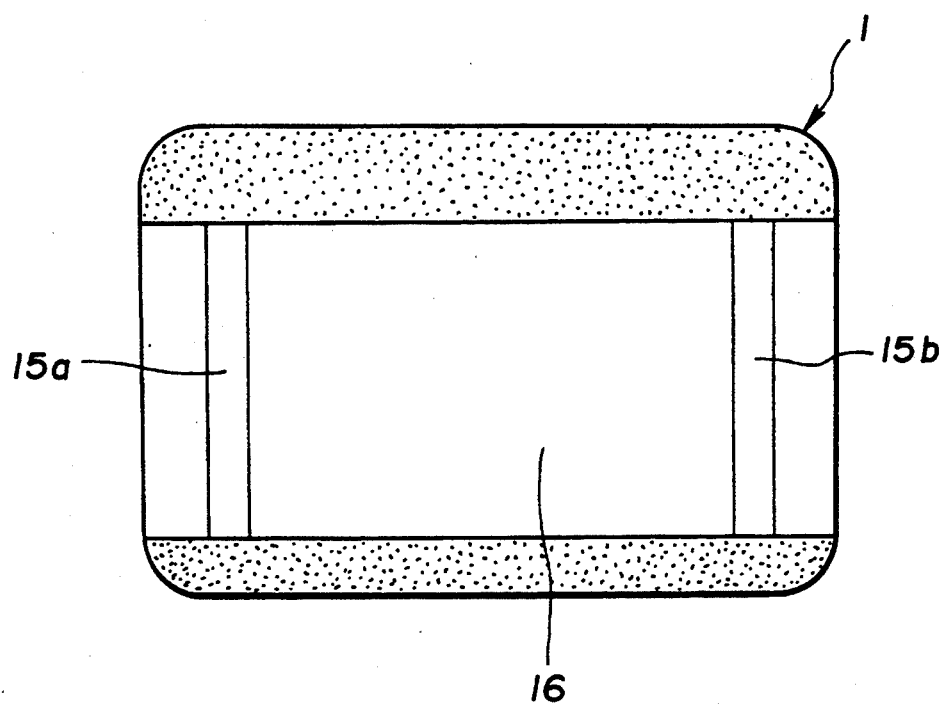
FIG. 1 illustrates an optical card.
Figure 2:
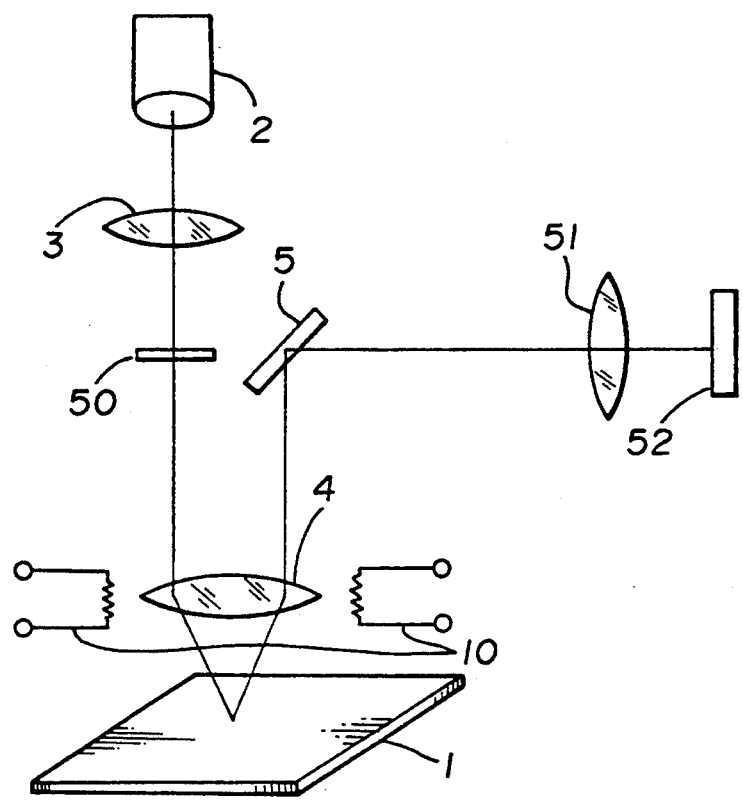
FIG. 2 illustrates the conventional structure of an optical system used for detecting a track error signal.
Figure 3:
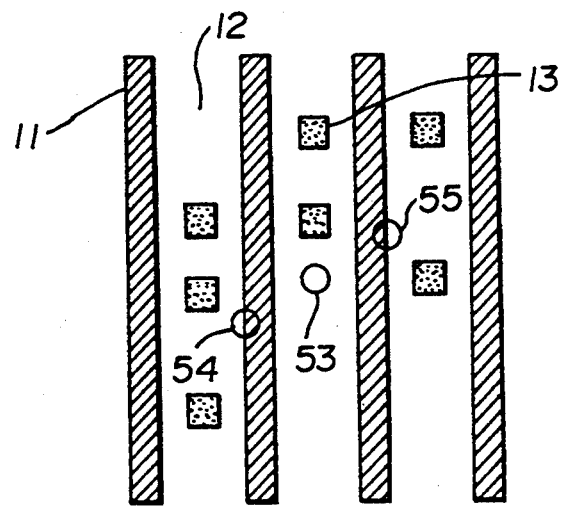
FIG. 3 is an enlarged view which illustrates light beams, tracks, guide tracks and data pits at the focused point on the optical card.
Figure 4:
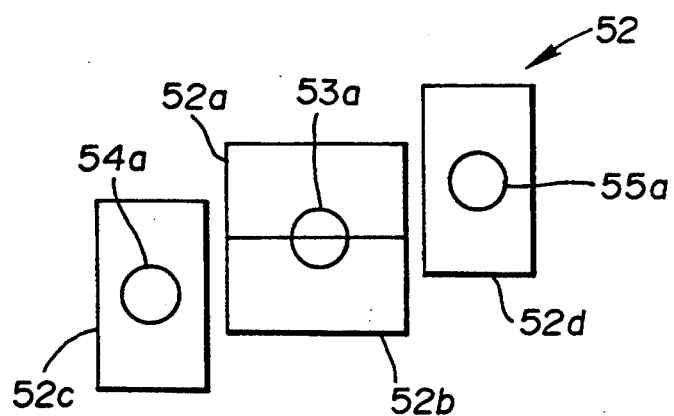
FIG. 4 illustrates a photo-detector of a conventional structure.
Figure 5:
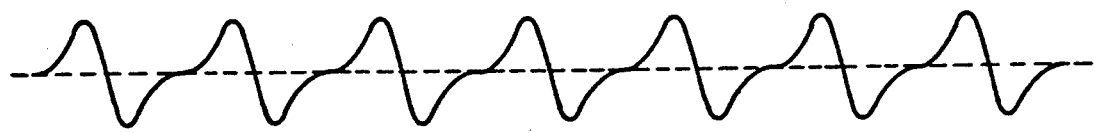
FIG. 5 illustrates the waveform of a track error signal used for the conventional structure.

The optical card 1 is reciprocated in the direction of tracks by an optical card sending mechanism (omitted from illustration). The optical card 1 employs the same structure as that of the optical card shown in FIG. 1.

Figure 7:
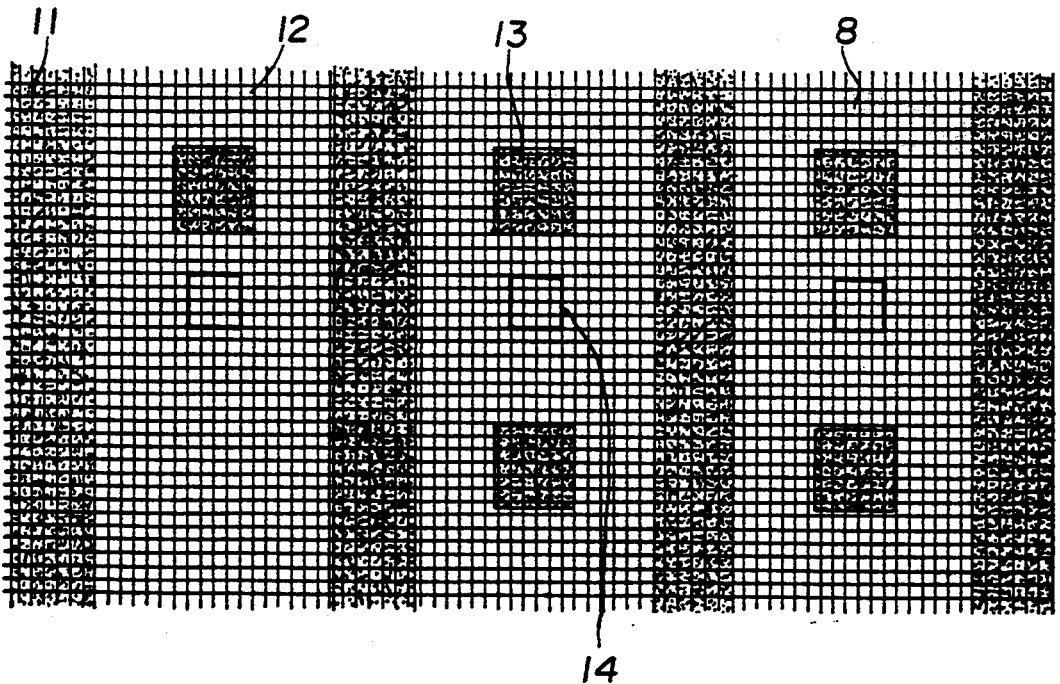

FIG. 7 is a partially enlarged view which illustrates a state where a light spot is formed on a medium recording surface of the CMD sensor 8. As shown in FIG. 7, guide tracks 11 and data pits 13 are formed in the detection portion on the surface of the CMD sensor 8. The data pits 13 are, as read signals, read by reading (for reproducing information) cells 14.

When information is reproduced, a tracking servo operation for maintaining the reading cells 14 at positions on the data pits 13 as shown in FIG. 7 is needed. In order to perform the tracking servo operation, a track error signal indicating the position of the reading cell 14 with respect to the track 12 must be used.

In actual fact, the light beams reflected by the optical card 1 are formed on the light receiving surface which serves as the detection portion of the CMD sensor 8 as shown in FIG. 8. Therefore, in this embodiment, cells serving as a plurality of light receiving portions of the regions designated by the diagonal lines of FIG. 8 are selected, and the track error signal is generated from the cell in the aforesaid region.

FIG. 9 illustrates the principle of the generation of the track error signal according to this embodiment. Although each of the cells of the CMD sensor 8 shown in FIG. 9(a) is coarsely divided with respect to a light spot in such a manner that one track is divided into 12 sections, it is actually divided in finer manner (into 60 to 240 sections). In this embodiment, the track error signal is generated by detecting the position of the guide track 11 on the CMD sensor 8. The detection of the guide track 11 is performed as follows:

That is, the cells shown in FIG. 9(a) disposed in the direction Y are added. The aforesaid addition is not limited to one column and may be carried out in such a manner that the cells on a plurality of cell columns are collectively added according to the number of the divisions of the cells. Then, the outputs each indicating the result of the addition are added at predetermined intervals. When the number of the divisions for one track is $Bn$, the sum of each of the following columns is obtained as follows.

| 1, | $Bn + 1$, | $2Bn + 1$, | $3Bn + 1, \ldots$ |
|---|---|---|---|
| 2, | $Bn + 2$, | $2Bn + 2$, | $3Bn + 2, \ldots$ |
| . | . | . | . |
| . | . | . | . |
| . | . | . | . |
| $Bn$, | $2Bn$, | $3Bn$, | $4Bn$ |

By obtaining the sum of each of the columns at intervals of one track as described above and by sequentially scanning the results of additions in direction X of FIG. 9(a), scanning signal CMDOUT shown in FIG. 9(b) can be obtained. When the sum of each column is obtained at intervals of one track, the addition of the columns of the cells is not limited to the interval of one track. The sum of the columns of the cells located at intervals which are integer multiples of the track intervals may be obtained.

The level of the signal CMDOUT is the lowest in portions which correspond to the guide tracks, while the level is the highest in portions in which the data pit is present and portions in which neither the guide track and nor the data pit are present.

Furthermore, a comparison level is set between the level of the data pit portion and the guide track portion, and the CMDOUT is binary-coded, so that a binary signal formed as shown in FIG. 9(c) and corresponding to the guide track portion can be generated.

It can be said that the scanning signal CMDOUT and the binary signal are signals indicating the intensiveness of information about the length of the column of the selected region of the CMD sensor 8 and information about the regions for the number of columns of tracks to be added.

A method of adding and a method of scanning the cells of the CMD sensor shown in FIG. 9 will now be described with reference to FIGS. 10 and 11.

Figure 10:
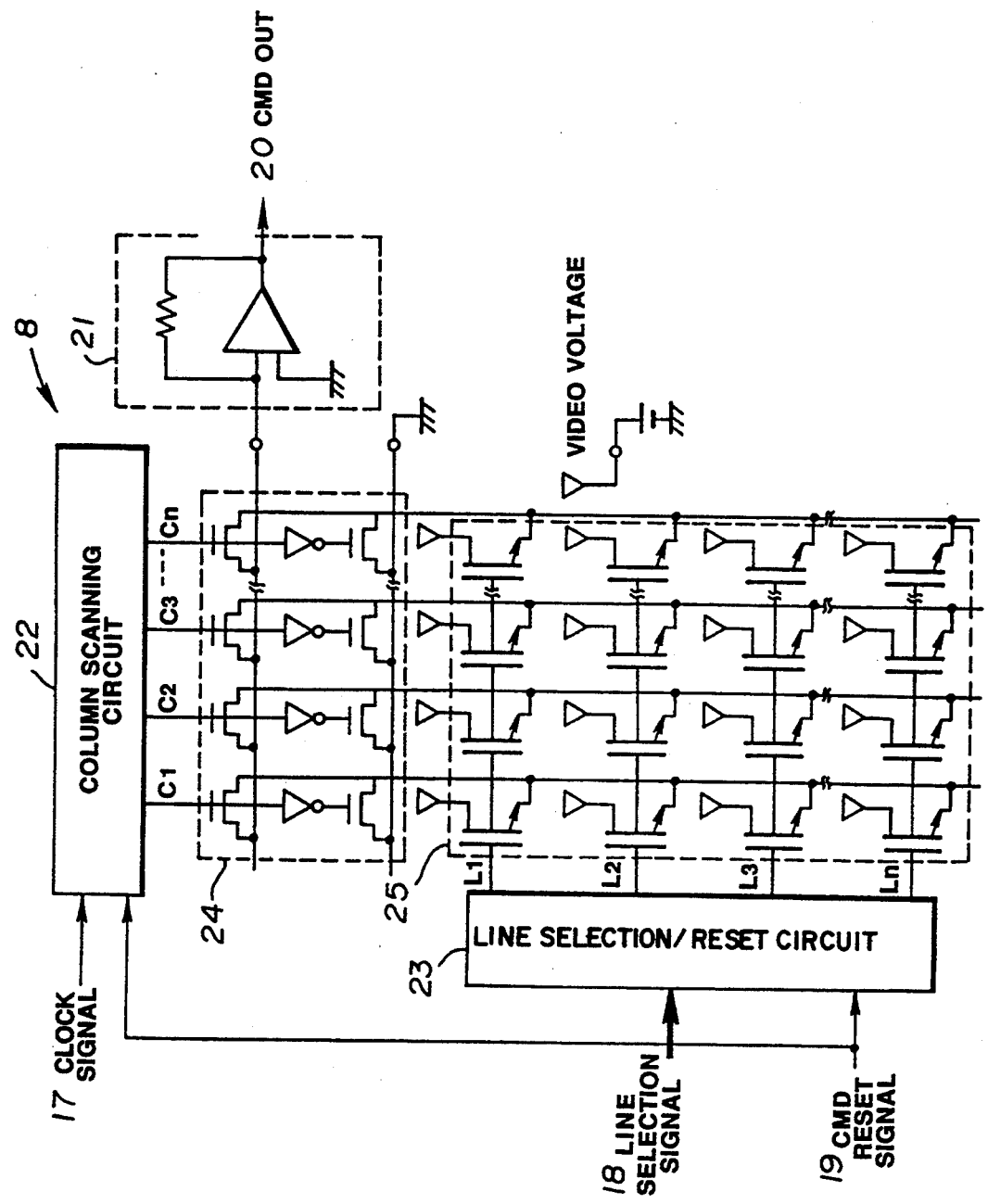

FIG. 10 illustrates the structure of a selection/scanning circuit serving as addition means for adding and scanning the cells of the CMD sensor 8. FIG. 11 illustrates the operation timing at the time of adding and scanning the cells. In FIG. 10, transistors in a region designated by a dashed line 24 are column selection transistors, while transistors in a region designated by a dashed line 25 are cell selecting transistors.

A plurality of lines on the CMD sensor 8 specified in response to a line selection signal 18 by a line selection/reset circuit 23 are selected in synchronization with a clock signal shown in FIG. 11(a). Then, the gate voltage, which corresponds to the selected line (Lx) (refer to FIG. 11(c)), is turned on. Since the CMD sensor 8 is usually wider than a beam, the lines which correspond to the beams on the CMD sensor 8 are partially selected as continuous regions.

A column scanning circuit 22 scans each column by sequentially outputting column selection signals (C1, CBn+1 ... ), (C2, CBn+2 ... ) ... (CBn, C2Bn ... ) which make gate voltage of the column selection transition 24 on based on the clock signal 17.

The column selection transistor 24 for the scanning operation is selected for each 12 columns as shown in FIG. 11(b) (an assumption is made here that the number of divisions of the track is 12). That is, column selection signals (C1, C13 ... ), (C2, C14 ... ) ... (C1, C24 ... ) are sequentially outputted from the column scanning circuit 22, and the column selection transistors 24 are actuated at an interval of 12 columns in accordance with the number of divided cells so as to be added to one another. Thus, they are sequentially scanned.

When the gate voltage of the cell selection transistor 25 is on, electric currents which are in proportion to the charge (which changes in accordance with the quantity of light) stored in the cell flows from a source to a drain. Furthermore, the electric currents flow from all of the actuated cell selection transistors 25 in all of the activated columns to the drain of the column selection transistor 24. Then, the currents are added to one another and converted into voltage by a current-to-voltage converter 21 so as to be sequentially outputted as the CMDOUT 20.

After one scanning operation has been completed, a CMD reset signal 19 is actuated as shown in FIG. 11(d) so that a line, which corresponds to a selected line (Lx), is made to be voltage (refer to FIG. 11(c)) which correspond to the reset level. Hence, the charge stored in each cell is discharged, and next scanning operation is commenced. In FIG. 11(c), a short dash line designates the level of the cell selection transistor 25 when it does not select the cell.

By repeating the aforesaid process, the sum of the addition signals for the columns which correspond to the number of the divided cells for one track are sequentially scanned.

Then, the structure of an essential portion of a track error signal generating circuit relating to this embodiment will now be described with reference to FIG. 12.

A timing controller 27 for controlling the timing of the scanning operation performed by the CMD sensor 8 is disposed so as to output a clock signal 17 and a CMD reset signal 19 to the CMD sensor 8. A binary coding circuit 32 is connected to the CMD sensor 8, so that the COMDOUT signal 20 scanned and outputted from the CMD sensor 8 as described above is supplied to a binary coding circuit 32.

The binary coding circuit 32 binary-codes the CMDOUT signal 20 by subjecting it to a comparison with a comparison level r 38. The output of the circuit 32 is, as a binary signal 39, outputted to an average value circuit 28 serving as average value calculating means.

A counter 26 serving as address output means is connected to the timing controller 27, so that the clock signal 17 and the CMD reset signal 19 are supplied. The counter 26 increases the count of the clock signals 17 so as to output the count value to the average value circuit 28 as an address signal 34.

The average value circuit 28 calculates the average value of the address signals 34 in a period in which the binary signal 39 is active, and outputs the average value to a holding circuit 29 as an average value signal 61. The holding circuit 29 is supplied with holding signals 35 outputted from the timing controller 27 whenever the scanning operation is completed, so that the holding circuit 29 holds an average value signal 62 in response to the holding signal 35, and outputs the held value to a subtractor 63 as an average value holding signal 62. The aforesaid counter 26, the average value circuit 28 and the holding circuit 29 constitute address detection means for detecting the address position which corresponds to the position of the guide track.

The subtractor 63 is, at the input terminal thereof, supplied with Bn/2 {(number of divisions of one track)/2} so as to subtract Bn/2 from the average value holding signal 62. Then, the subtractor 63 outputs an analog signal converged from the result of the subtraction by a D/A converter 31 as a track error signal 64.

Generation of the track error signal by means of the track error signal generating circuit shown in FIG. 12 will now be described.

The CMDOUT signal 20 scanned by and outputted from the CMD sensor 8 is binary-coded by the binary coding circuit 32 in accordance with the comparison level r 38, and is supplied to the average value circuit 28 as the binary signal 39. The counter 26 counts the clock signals 17 outputted from the timing controller 27 so as to output the count to the average value circuit 28 as the address signal 34.

FIG. 13 illustrates signals generated when the corresponding element are operated. The clock signal 17 shown in FIG. 13(b) is counted by the counter 26 and outputted as the address signal 34 shown in FIG. 13(a). The counted value of the counter 26 is cleared in response to the CMD reset signal 19 outputted from the timing controller 27 and shown in FIG. 13(c) whenever one scanning operation performed by the CMD sensor 8 is completed. Then, the count value is increased again starting from the address 1.

Since the binary signal 39 (refer to FIG. 13(d)) is activated only when the CMDOUT signal 20 corresponds to the guide track portion, the average value circuit 28 calculates the average of the values of the address signals 34 in only a period in which it corresponds to the guide track portion and outputs the result of the calculation to the holding circuit 29 as the average value signal 61 (see FIG. 13(e)).

As shown in FIG. 13(f), in the holding circuit 29, the holding signal 35 is outputted from the timing controller 27 whenever the scanning operation is performed. In response to the holding signal 35, the holding circuit 29 holds the average value signal 61 during one scanning operation, and outputs the held average value signal 61 as the average value holding signal 62 to the subtractor 63 (refer to FIG. 13(g)). Then, the subtractor 63 subtracts Bn/2 from the average value holding signal 62, and the D/A converter 31 converts the result of the subtraction into an analog signal and outputs it as the track error signal 64.

That is, the average value of the address of each scanning signal corresponding to the guide track portion obtained in response to the binary signal 39 is calculated, so that the address of the central portion of the guide track portion, that is, its position can be detected. By subtracting the half of the number of divided cells for one track from the address, the track error signal 64 indicating the transversal directional deviation of the beam can be obtained. In accordance with the track error signal 64, the tracking servo is performed.

FIG. 14 illustrates the track error signal 64 of this embodiment, where a dashed line designates the waveform of a conventional track error signal. It can be understood from FIG. 14 that the range, in which the track error signal can be detected, can be expanded. According to this embodiment, the range, in which the track error signal can be detected, can be expanded to a value (about 12 μm in usual) which is the same as the interval of the tracks. It is about four times the value obtainable from the conventional method.

If the beam is deviated from the center of the track by about ¼ of one track in the conventional structure, it cannot be restored to the original track because the signal reaches the positive or the negative peak. However, the range, in which the track error signal can be detected, can be expanded to an intermediate position from the adjacent track in this embodiment. Therefore, the beam can be restored to the original position if it is deviated considerably.

Since the range, in which the track error signal can be detected, can be expanded, stable tracking servo freed from the influence of vibrations or shock can be performed. In this embodiment, the time in which the CMD sensor is used to perform scanning is set to be a time (for example, 10 μsec) sufficiently faster than the tracking servo following speed.

Since the column directional sum of the CMD sensor is calculated and the signal indicating the position of the guide track is obtained from information of the plurality of the tracks as described above, an influence of dust or a defect such as a flaw can be eliminated satisfactorily even if it is present. Therefore, the tracking servo cannot be made unstable.

For example, where the column directional size of the defect is Dc, the number of defects overlapping the line direction track is Dr, the column directional number of cells is Cn and the line directional number of tracks is Tn, the influence of the defect can be reduced as follow:

$$(Dc/Cn) \times (Dt/Tn)$$

Therefore, the level does not exceed the comparison level r in the binary circuit 32 in almost all cases. Therefore, a track error signal can stably be generated in a manner freed from an influence of dust on the card or a defect such as a flaw of the card.

Since the CMD sensor 8 is activated by storing the charges in proportion to the light quantity, the actual scanning operation is, as shown in FIG. 15(b), performed by the CMD after the charges have been stored in the charging period arranged prior to the scanning operation. Although there arises a problem of the difference in the time in which actual charging is performed by turning on the light source (the light emitting device 2) as shown in FIG. 15(a) due to the time lag between the scanning start and the scanning completion, the relative charging period is, as shown in FIG. 15(b), lengthened with respect to the scanning period, so that the influence of the aforesaid problem can be eliminated satisfactorily.

Although FIG. 15 illustrates the case where the light source is always turned on as shown in FIG. 15(a), the aforesaid problem can be overcome by turning on the light source in only the charging period and by turning off the same in the scanning period. A switch type structure may be arranged in which scanning is performed by the method shown in FIG. 15 in the case where information is recorded and scanning is performed by the method shown in FIG. 16 in the case where information is reproduced.

Figure 17:
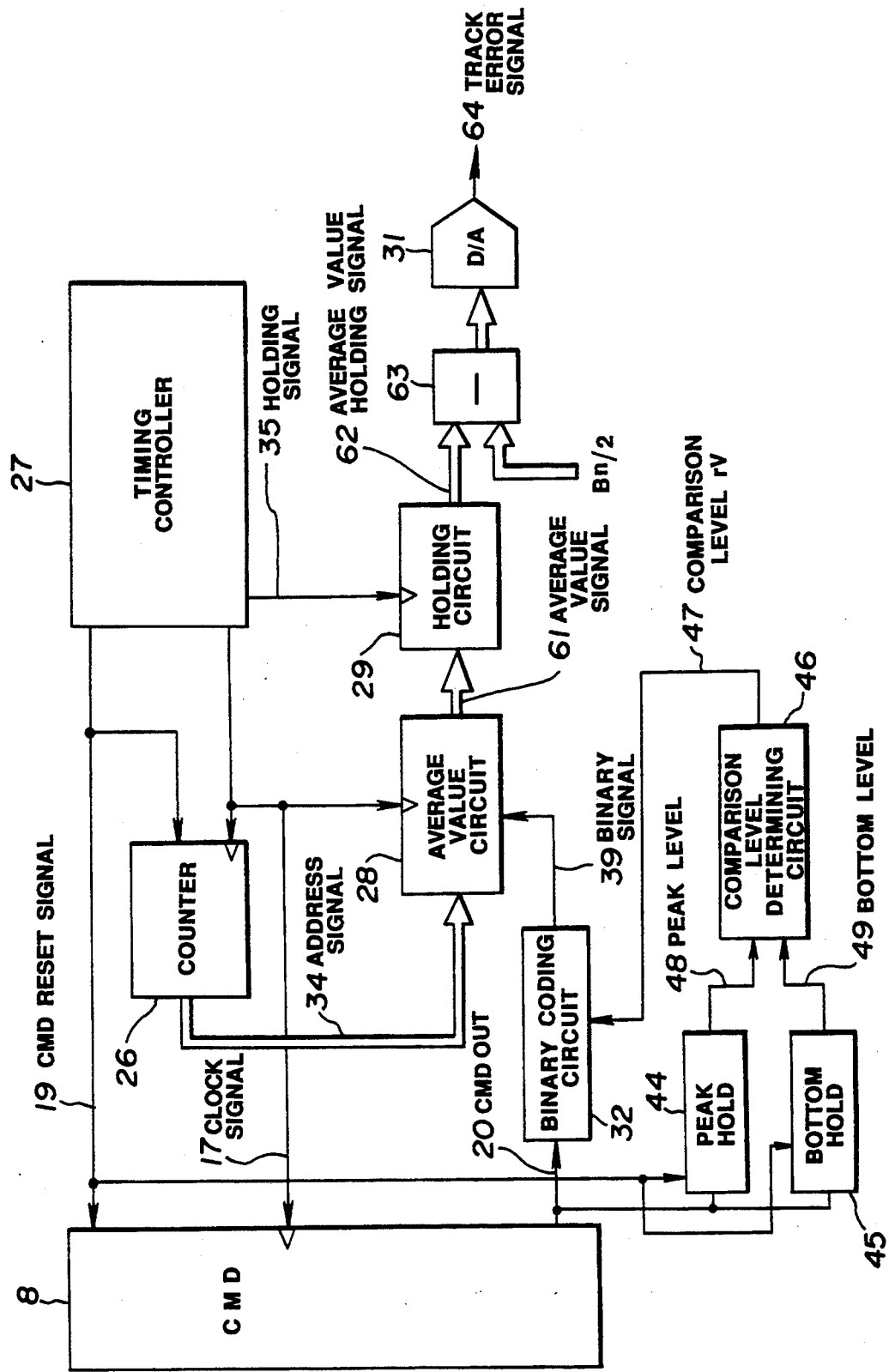

FIGS. 17 and 18 relate to a second embodiment of the present invention, wherein FIG. 17 is a block diagram which illustrates the structure of an essential portion of the second embodiment and FIG. 18 illustrates a comparison level used for the binary coding circuit.

The second embodiment is a modification of the first embodiment in which the comparison level r in the binary coding circuit 32 can be changed.

In this first embodiment, the comparison level for detecting the guide track portion is fixed. However, the CMDOUT signal 20 serving as the scanning signal can be considerably changed due to irregularity of the reflectance of the guide track portion and the track portion of the optical card or irregularity of the optical system. Also the CMDOUT signal 20 can be changed even on the same card depending upon the place due to contamination of the card.

In order to overcome the aforesaid problem, the second embodiment, which is an improvement of the first embodiment, is arranged in such a manner that the comparison level r can be changed in accordance with the medium so as to accurately detect the position of the guide track portion.

FIG. 17 illustrates an essential portion of the structure of the second embodiment, wherein a peak holding circuit 44 serving as maximum value detection means, a bottom holding circuit 45 serving as minimum value detection means and a comparison level determining circuit 46 serving as binary coding level setting means are employed in addition to the structure of the first embodiment. The other structures are the same as those of the first embodiment. The same elements as those of the first embodiment are given the same reference numerals and their descriptions are omitted here.

The CMDOUT signal 20 outputted from the CMD sensor 8 is supplied to the peak holding circuit 44 and the bottom holding circuit 45, so that a peak level 48, which is the maximum value in one scanning operation, and a bottom level 49, which is the minimum level, are detected. The peak holding circuit 44 and the bottom holding circuit 45 are reset in response to the CMD reset signal 19 whenever one scanning operation is performed.

The comparison level determining circuit 46 generates a comparison level rV 47 on the basis of the peak level 48 and the bottom level 49 and outputs it to the binary coding circuit 32.

FIG. 18 illustrates the relationship held at this time between the comparison level rV 47, the peak level 48, the bottom level 49 and the CMDOUT signal 20. According to this embodiment, the comparison level rV 47 is set to, for example, an intermediate value between the peak level 48 and the bottom level 49. The comparison level rV 47 is used to binary-code the CMDOUT signal 20, so that the binary signal 39, accurately corresponding to the position of the guide track portion, is generated. The ensuing operations are the same as those of the first embodiment.

Since the comparison level rV 47 is determined on the basis of the actually detected maximum value and the minimum value of the CMDOUT signal 20 so as to binary-code the CMDOUT signal 20 as described above, the accurate position of the guide track portion can be detected regardless of irregularity of the reflectance of the medium and that of the optical system. As a result, the error of the track error signal is reduced and therefore the tracking servo can further stably be performed. Since the comparison level rV 47 is reset in response to the CMD reset signal 19 and is changed whenever one scanning operation is performed, uneven reflectance distributed depending on the parts of the medium can be satisfactorily dealt with. That is, the second embodiment has an additional advantage to that obtainable from the first embodiment that a satisfactory effect can be obtained even if the reflectance differs depending on the parts of the medium.

FIGS. 19 to 23 illustrate a third embodiment of the present invention.

FIG. 19 illustrates the principle of generating the track error signal according to the third embodiment. Although each cell of the CMD sensor 8 shown in FIG. 19(a) is coarsely arranged with respect to the light spot similarly to the first embodiment, it is finely divided in actual fact.

According to the third embodiment, the cells arranged in the direction Y of FIG. 19 are added, and outputs each indicating the addition are sequentially scanned, so that a scan signal formed as shown in FIG. 19(b) is obtained. The level of the aforesaid scan signal is the lowest in a portion, which corresponds to the guide track, while the level is the highest in a portion in which neither the guide track nor data pit is present.

Furthermore, a comparison level is established between the level of the data pit portion and the guide track portion so as to be binary-coded. Hence, a binary signal corresponding to the guide track portion and formed as shown in FIG. 19(c) is generated.

Then, a method of adding the cells and scanning the same will now be described with reference to FIG. 20. The selection/scanning circuit for adding/scanning the cells of the CMD sensor 8 is constituted similarly to that of the first embodiment shown in FIG. 10.

The lines of the CMD sensor 8 are selected in such a manner that a plurality of lines on the CMD sensor 8 specified in response to the line selection signal 18 by the line selection/reset circuit 23 are selected in synchronization with the clock signal shown in FIG. 20(a), and the gate voltage of the transistors corresponding to the selected line (Lx) (refer to FIG. 20(c)) is turned on.

Next, the column scanning circuit 22 scans each column (refer to FIG. 20(b)) by sequentially outputting column selection signals C1, C2, . . . Cn which turn on the gate voltage of the column selection transistor 24 in response to the clock signal 17. That is, the columns are sequentially scanned one by one.

When the gate voltage of the cell selection transistor is turned on, an electric current which is in proportion to the charge stored in the .cell flows from the source to the drain. Furthermore, electric currents flow from all of the cell selection transistors, which have been turned on, to the drain of the column selection transistor 24 so as to be added. The results of the additions are converted into voltage by the current-to-voltage converter 21 so as to be sequentially outputted as the CMDOUT signal 20.

By repeating the aforesaid operation, the signals indicating the additions of the columns are sequentially scanned. After one scanning operation has been completed, the CMD-reset signal 19 shown in FIG. 20(d) is activated, causing the line corresponding to the selected line (Lx) to be voltage which corresponds to the reset level. As a result, the charge stored in each cell is discharged, and the next scanning operation is again started.

The structure of an essential portion of a track error signal generating circuit according to this embodiment will now be described with reference to FIG. 21.

Since the third embodiment is different from the first embodiment in the method of the scanning operation performed by the CMD sensor 8, information denoted by the CMDOUT signal 20, which is the output from the CMD sensor 8, is different from that of the first embodiment. Accordingly, the third embodiment has, in addition to the structure of the first embodiment, a window generating circuit 30 and an AND circuit 33. The window generating circuit 30 serves as setting means for setting the region of a light receiving portion including the position of the guide track.

Figure 21:
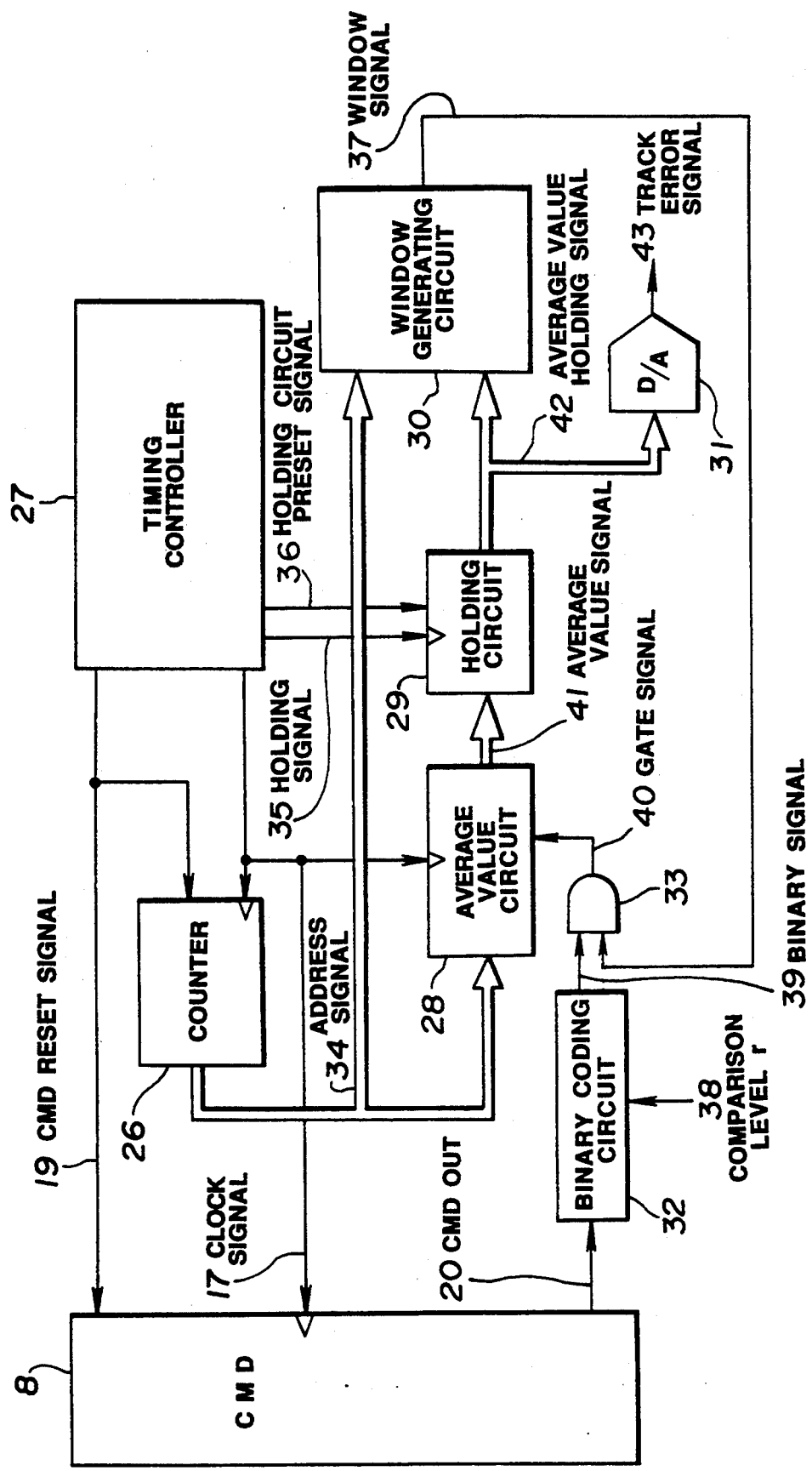
FIG. 21 is a block diagram which illustrates the structure of an, essential portion of the third embodiment.

In FIG. 21, the clock signal 17 outputted from the timing controller 27 is supplied to the CMD sensor 8, the counter 26 and the average value circuit 28. When the clock signal 17 is supplied, the CMD sensor 8 is scanned as described above and the CMDOUT signal 20 outputted due to the scanning operation is supplied to the binary coding circuit 32.

When one scanning operation of the CMD sensor 8 is completed in response to the applied clock signal 17, the timing controller 27 outputs the CMD reset signal 19 to the CMD sensor 8. The CMD reset signal 19 is also supplied to the clear terminal of the counter 26. The counter 26 counts the clock signals 17 and outputs the counted value, as the address signal 34, to the average value circuit 28 and the window generating circuit 30 for generating the window signal 37. The aforesaid counted value is cleared in response to the CMD reset signal 19 when one scanning operation of the CMD sensor 8 is completed. Then, counting is made from the address 1.

The binary coding circuit 32 generates the binary signal 39 by making a comparison with the comparison level r 38. Then, the binary signal 39 being applied to either of the input terminals of the AND circuit 33. The AND circuit 33 calculates the AND (logical sum) of the binary signal 39 and the window signal 37 so as to form a gate signal 40 which is supplied to the average value circuit 28. The CMDOUT signal 20 which is an output for scanning the CMDOUT sensor 8 is supplied to the binary coding circuit 32. Since the binary coding signal 39 is activated only when the CMDOUT signal 20 at the time of scanning the guide track portion is input, the gate signal 40 is activated only when the guide track portion is being scanned and the window signal 37 is active.

The average value circuit 28 calculates the average of the values of the address signal 34 only when the gate signal 40 is active, and then outputs the result of the calculation to the holding circuit 29 as an average value signal 41. The holding circuit 29 holds the average value signal 41 in response to the holding signal 35 outputted whenever the scanning operation is completed, and retains the value during one scanning operation so as to make it to be an average value holding signal 42 which is outputted to the window generating circuit 30 and the D/A converter 31.

The timing controller 27 activates a holding circuit preset signal 36 to be supplied to the holding circuit 29 at the commencement of the operation so as to set the output from the holding circuit 29 to a predetermined value (for example, the middle value of the column address).

The average value holding signal 42 is converted into an analog signal by the D/A converter 31 and outputted as a track error signal 43.

The window generating circuit 30 is arranged to activate the window signal 37 only when the address signal 34 is in a predetermined range determined relative to the value of the average value holding signal 42. Therefore, the average value holding signal 42 indicating the position of the guide track at the moment before one scanning operation.

Figure 22:
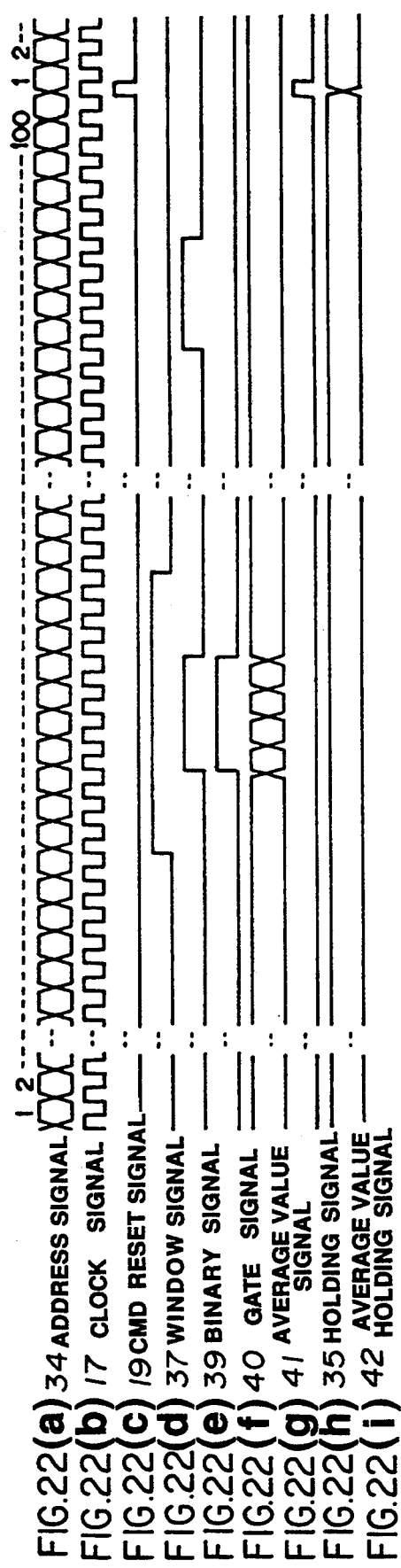
FIG. 22(a-f) is a time chart which illustrates the operation of the components at the time of generating the track error signal according to the third embodiment.

FIG. 22 illustrates the timing of each of the signals of the aforesaid operations. The description is made here while an assumption is made that the number of the columns to be scanned is 100. The initial operation of the circuit according to this embodiment is performed after the output from the holding circuit 29 is set to a predetermined value in response to the holding circuit preset signal 36 outputted from the timing controller 27 shown in FIG. 21.

In response to the clock signal 17 shown in FIG. 22(b), the counter 26 outputs the address signal shown in FIG. 22(a) to the average value circuit 28 and the window generating circuit 30. The window generating circuit 30 outputs the window signal 37 shown in FIG. 22(d) to the AND circuit 33 in response to the address signal 34. When the CMD sensor 8 outputs the CMDOUT signal 20 in the period in which the window signal 37 is active, the binary coding circuit 32 outputs the binary signal 39 shown in FIG. 22(e) to the AND circuit 33 in which the binary signal 39 is converted into the gate signal 40 shown in FIG. 22(f). The gate signal 40 is then outputted to the average value circuit 28.

The width of the window of the window signal 37 shown in FIG. 22(d) is set to about one track pitch in order to cause one guide track 11 to be detected. As an alternative to this, another structure may be employed in which the width of the window is widened, a plurality of guide tracks 11 are detected by the binary coding circuit 32, and the output indicating the result of the detection is outputted to the average value circuit 28 via the AND circuit 33. In this case, the address position is determined on the basis of the positions of the plurality of the guide tracks 11.

The average value circuit 28 outputs the average value signal 41 shown in FIG. 22(g) to the holding circuit 29. The holding circuit 29 updates and holds the average value signal 41 in response to the holding signal 35 shown in FIG. 22(h) outputted from the timing controller 27 so as to output it, as the average value holding signal 42, to the window generating circuit 30 and the D/A converter 31 at the next scanning operation. In response to the track error signal outputted from the D/A converter 31, the tracking servo is performed.

Since the holding circuit preset signal 36 is outputted at only the first commencement of the scanning operation, the holding signal 35 is not outputted, but the holding signal 35 is outputted at the commencement of the next scanning operation.

When one scanning operation is completed, the CMD reset signal 19 shown in FIG. 22(c) is outputted from the timing controller 27. In the next scanning operation, a similar operation is performed, but the average value holding signal 42 detected by the first scanning operation is held in the holding circuit 29. Based on the average value holding signal 42, a similar operation is again performed.

Even if the guide track is considerably deviated during scanning due to vibrations or shock, the position of the window signal 37 with respect to scanning becomes deviated with the deviation of the guide track because the track error signal is generated as described above. Therefore, the deviation can be correctly detected while being not affected by the adjacent guide track. Hence, the track error signal can be theoretically generated in a range permitted by the size of the formed spot on the CMD sensor 8.

Figure 23:
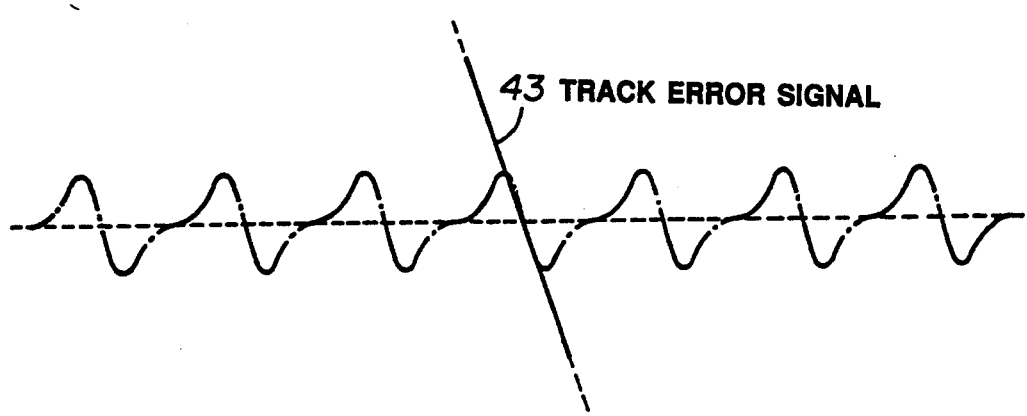
FIG. 23 illustrates the waveform of a track error signal obtainable in the third embodiment.

In FIG. 23, the track error signal 43 which can be detected in a widened range is designated by a solid line, while an alternate long and short dash line designates a conventional track error signal. As can be understood from FIG. 23, the conventional track error signal is a cyclic function the cycle of which is the distance between tracks. That is, the deviation by ¼ of one track from the center of the track causes the level of the track error signal to reach its positive or negative peak value, and therefore the track error signal can be restored to the original track. According to this embodiment, the photo-detecting cell of the CMD sensor 8 can be made to be corresponded to the position of the beam spot irradiated onto the optical card 1. Therefore, the range in which the track error signal, which can be generated by the CMD sensor 8, can be considerably expanded. That is, even if the track error signal is considerably deviated from the position to be tracked, it can be restored to the original position in this embodiment.

The time in which the CMD sensor 8 is scanned is set to, for example, 10 μsec which is sufficiently faster than the following speed of the tracking servo similarly to the first embodiment. Since the deviation which will take place due to the vibrations or shock can be reduced in the aforesaid short time and deviation for one scanning operation can be substantially neglected, the window signal 37 can substantially assuredly follow the deviation of tracking.

Since the signal denoting the position of the guide track is obtained by calculating the columnar directional sum as described above, influence of a defect on the optical card 1 can be eliminated satisfactorily if the defect is present.

Assuming that the column directional size of the defect is D and the number of the cells on the column is Cn, the influence of the defect can be reduced to D/Cn. Therefore, the level does not exceed the comparison level in almost all cases. Hence, the tracking error signal can be stably generated while being freed from an influence of dust and a defect such as a flaw of the card.

Figure 25:
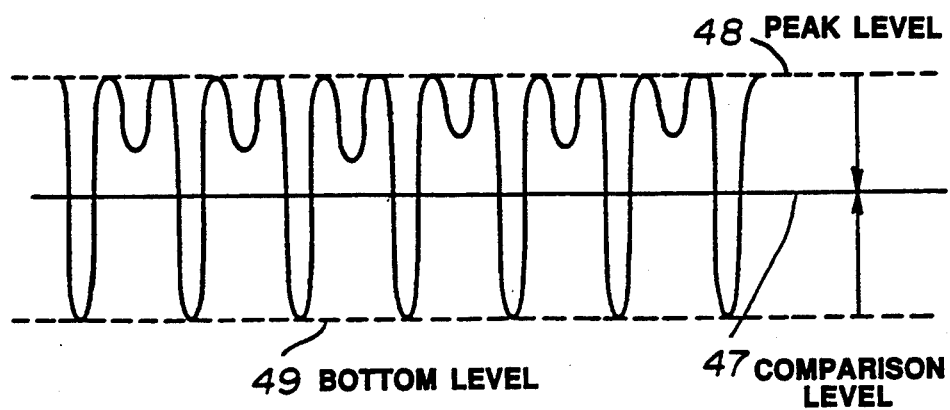

FIGS. 24 and 25 illustrate a fourth embodiment of the present invention, where FIG. 24 is a block diagram which illustrates an essential portion of the fourth embodiment and FIG. 25 illustrates a comparison level for use in the binary coding circuit.

The fourth embodiment of a modification of the third embodiment. In the fourth embodiment, the comparison level r used in the binary coding circuit 32 can be changed in accordance with the medium similarly to the second embodiment.

FIG. 24 illustrates the structure of an essential portion of the fourth embodiment, wherein the peak holding circuit 44 the bottom holding circuit 45 and the comparison level determining circuit 46 are, similarly to the second embodiment, employed in addition to the structure of the third embodiment. The residual structures are the same as those of the third embodiment.

Similarly to the second embodiment, the maximum value and the minimum value in one scanning operation are detected from the CMDOUT signal 20 by the peak holding circuit 44 and the bottom holding circuit 45. Furthermore, the comparison level rV 47 is generated by the comparison level determining circuit 46 from the peak level 48 and the bottom level 49 so as to output the comparison level rV 47 to the binary coding circuit 32.

FIG. 25 illustrates the relationship realized at this time among the comparison level rV 47, the peak level 48, the bottom level 49 and the CMDOUT signal 20. According to this embodiment, the comparison level rV 47 is set to an intermediate value between the peak level 48 and the bottom level 49. The comparison level rV 47 is used to binary-code the CMDOUT signal 20, so that the binary signal 39 accurately corresponding to the position of the guide track portion is generated. The ensuing operations are the same as those of the third embodiment.

Since the comparison level rV 47 is determined on the basis of the maximum value and the minimum value of the actually detected CMDOUT signal 20 as described above and the binary coding operation is performed, an accurate position of the guide track portion can be detected regardless of the reflectance of the medium and irregularity of the optical systems. As a result, the error of the track error signal can be reduced and therefore further stabilized tracking servo can be performed. Since the comparison level rV 47 is reset in response to the CMD reset signal 19 and is changed whenever one scanning operation is performed, a satisfactory effect can be obtained even if the reflectance differs depending on the parts of the medium. That is, the fourth embodiment has, in addition to the effect obtainable from the third embodiment, an advantage that a satisfactory effect can be obtained even if the reflectance differs depending on the parts of the medium.

FIGS. 26 to 29 illustrate a fifth embodiment of the present invention.

Figure 26:
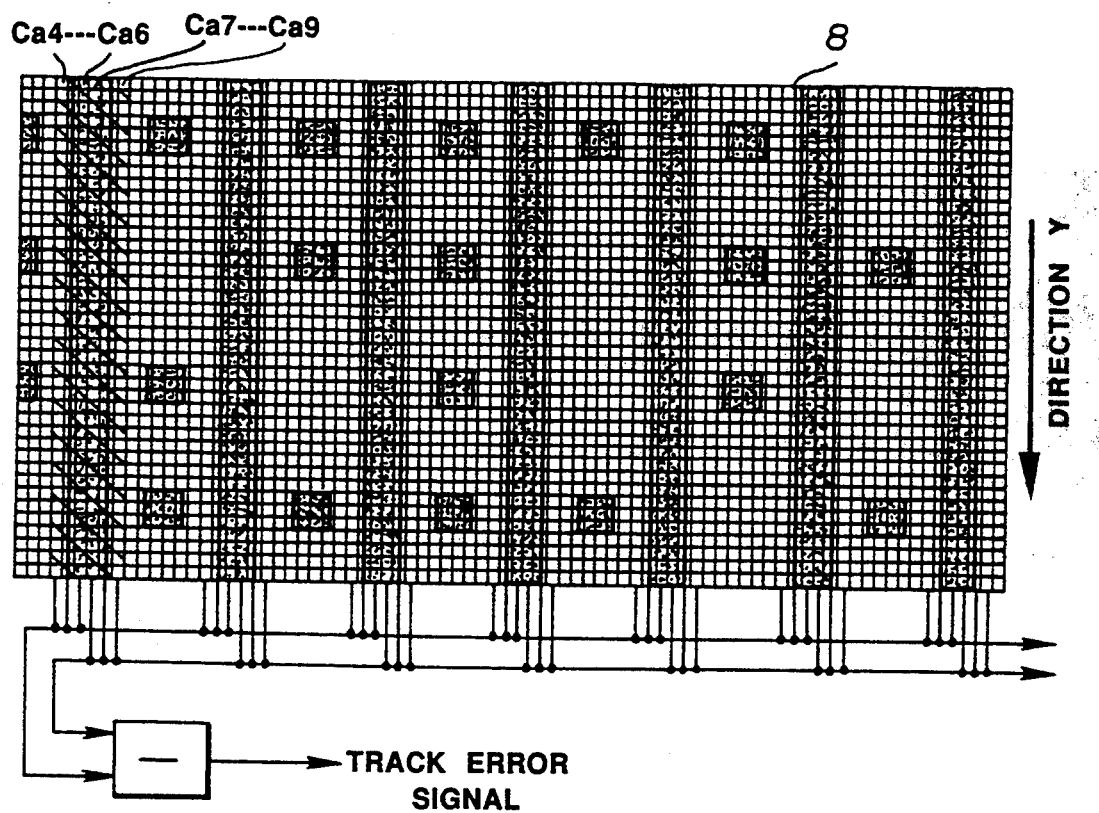
FIGS. 26 to 29 relate to a fifth embodiment of the present invention, where

FIG. 26 illustrates the principle of the generation of the track error signal according to the fifth embodiment. Also the number of divisions of the cell of the CMD sensor 8 for one track is assumed to be 12 also in this embodiment.

In the fifth embodiment, outputs in the cells disposed in the direction Y of FIG. 26 are added, and the added outputs are added in continuous regions {(Ca4, Ca5, Ca6) . . . in the structure shown in FIG. 26}. It should be noted that the regions continued at intervals for the number of divisions of the cell for one track are added. Then, the continuous regions adjacent to the added regions are added similarly ({(Ca4, Ca5, Ca6) . . . in the structure shown in FIG. 26}.

By calculating the difference between the sums of the adjacent two regions, the track error signal can be produced. That is, the difference between the added output of the three continued column regions corresponding to the position of the guide track and the added output of the adjacent three columns is calculated, so that the track error signal is produced.

The track error signal thus obtained is, similarly to the first embodiment, the intensiviness of information about the length of the column of the selected region of the CMD sensor 8 and information about the range of the number of tracks the columns of which are added.

Then, the method of adding and scanning the cells of the CMD sensor shown in FIG. 26 will now be described with reference to FIG. 27.

Figure 27:
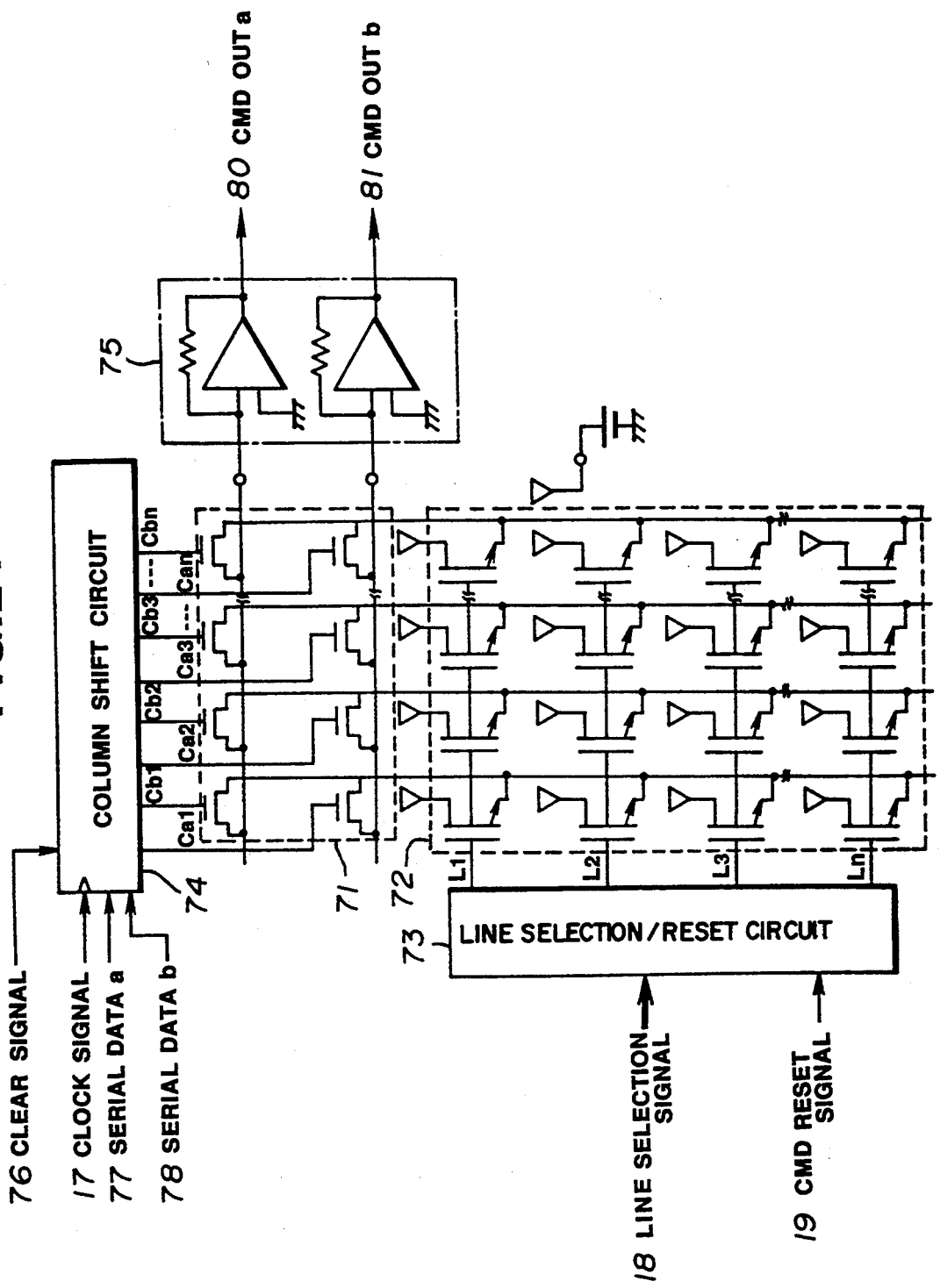

FIG. 27 illustrates the structure of the selection/scanning circuit for adding/scanning the cells. In FIG. 27, transistors included by a region designated by a dashed line 71 are column selection transistors, while transistors included by a region designated by a dashed line 72 are cell selection transistors.

The portion for selecting the line is structured similarly to the circuit of the first embodiment shown in FIG. 10, wherein a plurality of lines corresponding to the formed beam on the CMD sensor are selected by a line selection/reset circuit 73 and a cell selection transistor 72.

A column shift circuit 74 is, from the timing controller 27, supplied with the clock signal 17, a clear signal 76, serial data a 77 for specifying adjacent and continued regions and serial data b 78 so that columns are added. The column shift circuit 74 is previously supplied with a clear signal 76, so that each output (Ca1, Ca2 . . . , Cb1, Cb2 . . . ) of the column selection transistor 71 is cleared. Furthermore, the previously set serial data a 77 and b 78 are supplied and they are sequentially shifted in synchronization with the clock signal 17, so that a column selection signal for sequentially turning on the gate voltage of the Corresponding column selection transistors 71 is outputted.

The column selection transistors 71 are divided into two groups formed by, as described above, the continued and adjacent regions as follows:

Ca1, Ca2, . . . , Can
Cb1, Cb2, . . . , Cbn

The serial data a 77 and b 78 are set to respectively correspond to the aforesaid regions.

The column selection signals are outputted in the case shown in FIG. 26 as follows:

Ca4, Ca5, Ca6, Ca16, Ca17, Ca18, Ca28, Ca29, Ca30, . . .

Cb7, Cb8, Cb9, Cb19, Cb20, Cb21, Cb31, Cb32, Cb33, . . .

The column selection transistors 71 are sequentially turned on, so that the selected columns are added (among the subscripts of the column selection signals, the numerals indicate the positions of the columns and a and b indicate the groups).

When the gate voltage of the cell selection transistor 72 is turned on, an electric current, which is in proportion to the charge stored in the cell, flows from the source to the drain similarly to the first embodiment.

Furthermore, electric currents flow from all of the activated cell selection transistors to the drain of the column selection transistors so as to be added in each of the two groups. They are converted into voltage by the current-to-voltage converter 75 so as to be outputted as CMDOUTa signal 80 and CMDOUTb signal 81. The CMDOUTa signal 80 is the sum of the columns Ca4, Ca5, Ca6..., while the CMDOUTb signal is the sum of the columns Cb7, Cb8, Cb9...

Figure 28:
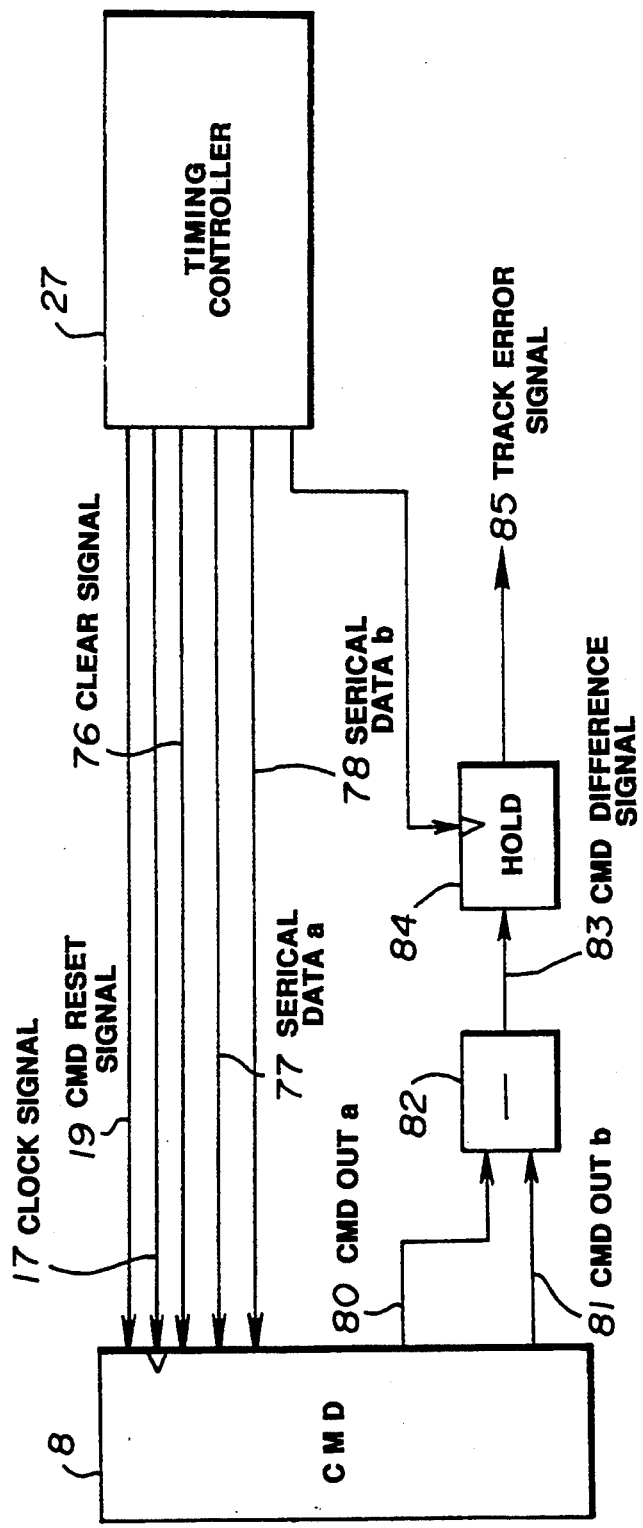

Then, the structure of a track error signal generating circuit according to this embodiment will now be described with reference to FIG. 28.

As described above, the CMD sensor 8 is, from the timing controller 27, supplied with the clock signal 17, the clear signal 76, the serial data a 77 and b 78 so as to be scanned and added, so that the CMDOUTa signal 80 and the CMDOUTb signal 81 are outputted. That is, the timing controller 27 has a function as region selection means which outputs the serial data a 77 and b 78 so as to select a plurality of two adjacent regions at intervals of the tracks.

The CMDOUTa signal 80 and the CMDOUTb signal 81 are supplied to a subtractor 82, so that their difference is calculated and the result of the subtraction is outputted as a CMD difference signal 83. A holding circuit 84 for holding the CMD difference signal 83 at predetermined intervals holds the CMD difference signal 83 based on the clock signal 17 so as to transmit it as a track error signal 85.

Figure 29:
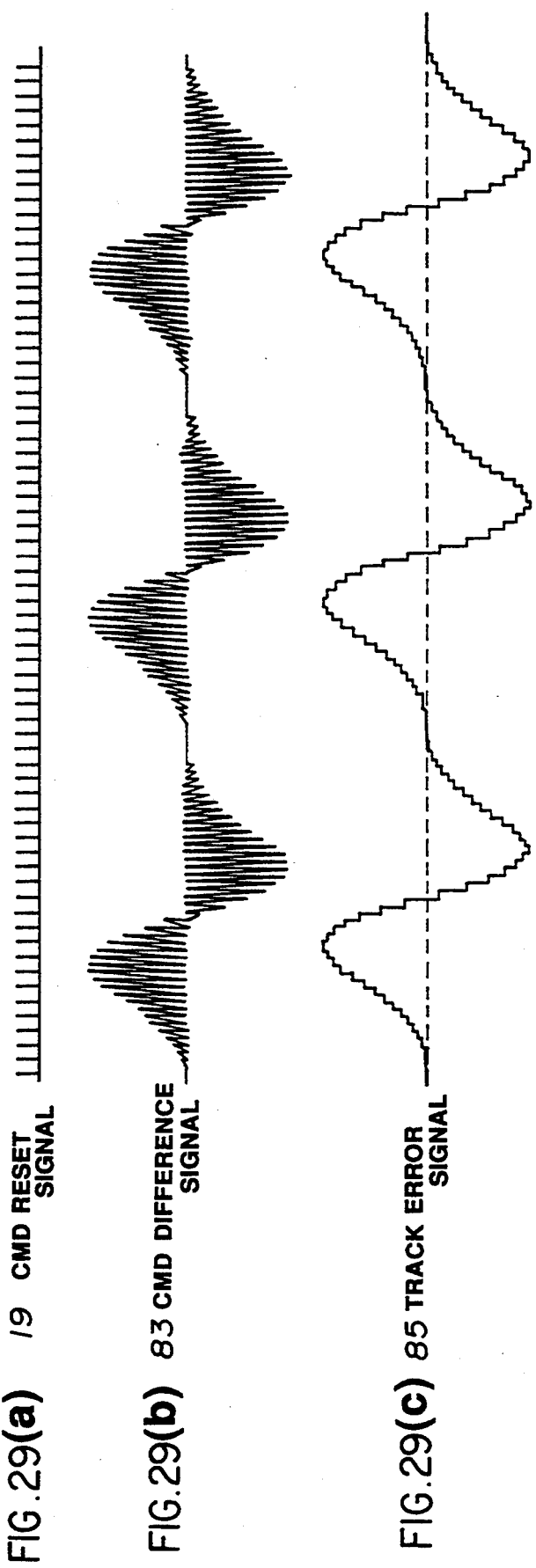

FIG. 29 illustrates the waveforms of the CMD difference signal 83 and the track error signal 85. In order to cause the description to be easily understood, the waveforms of the signals formed when the light spot is displaced in a direction traversing the track. Since the each cell of the CMD sensor 8 stores the charge in proportion to the incidental light quantity, the output of the CMD difference signal 83 is in the form obtained by integration as shown in FIG. 29(b). Therefore, by holding the CMD difference signal 83 at predetermined intervals in response to the clock signal 17 and by resetting the CMD sensor 8 in response to the CMD reset signal 19, the track error signal 85 in the form, which is continuously changed as shown in FIG. 29(c), can be obtained.

Since the column directional sum of the CMD sensor 8 is calculated and the track error signal is obtained from information about the plurality of the tracks as described above, the influence of a defect on the card can be eliminated if the defect is present. Therefore, similar to the first embodiment, the tracking servo cannot be made unstable. Hence, the influence of a defect on the medium can be eliminated satisfactorily. As a result, the track error signal can stably be generated while eliminating dust and the defect such as a flaw.

FIGS. 30 to 33 illustrate a sixth embodiment of the present invention.

The sixth embodiment is a modification of the fifth embodiment, wherein the column to be scanned by the CMD sensor 8 can be changed.

In the fifth embodiment, the column to be scanned by the CMD sensor 8 is selected fixedly. However, in the case where the track error signal is generated by using information about a plurality of tracks, there arises a problem in that the track error signal cannot be correctly generated because the relationship between the selected columns and the guide tracks can be considerably deviated due to uneven distribution of the track intervals in the optical card or irregularity of the magnification of the optical system.

In order to overcome the aforesaid problem, the sixth embodiment is achieved by further improving the fifth embodiment in such a manner that the column to be scanned can be changed, so that a correct error signal can be generated.

The sixth embodiment is arranged in such a manner that the cells are added and scanned by the CMD sensor 8, so that the position of the guide track is detected. Based on the detected position, the serial data a 77 and b 78 are set.

Similarly to the third embodiment shown in FIG. 19, outputs in the cells disposed in the direction Y of FIG. 19 are added, and the outputs indicating the additions are sequentially scanned in the direction X of FIG. 19, so that the scanning signal can be obtained. Furthermore, the comparison level is set between the level of the data pit portion and the guide track portion so as to be binary-coded. Thus, a binary signal corresponding to the guide track portion is generated.

Figure 30:
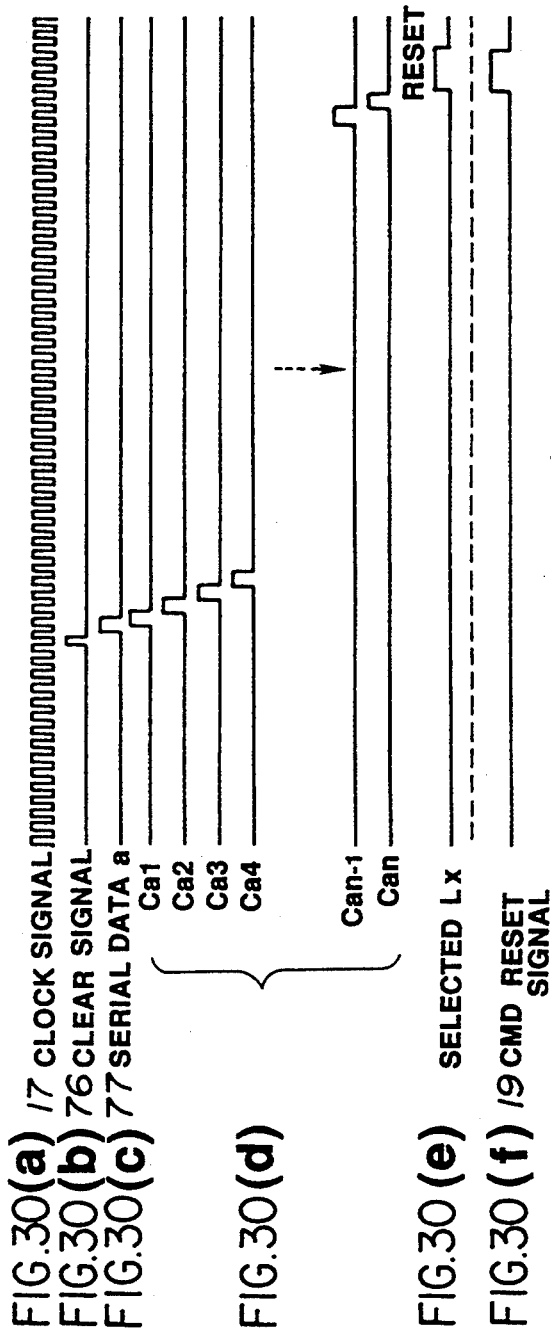
FIGS. 30(a-f) to 33 relate to a sixth embodiment of the present invention, where FIGS. 30(a-f) is a time chart which illustrates the operation timing at the time of adding/scanning the cells.

FIG. 30 illustrates the operation timing at the time of the addition and scanning the cells by the selection/-scanning circuit of the CMD sensor 8 shown in FIG. 27.

The selection of the lines of the CMD sensor 8 is performed in such a manner that a plurality of lines on the CMD sensor 8 specified in response to the line selection signal 18 by the line selection/reset circuit 73 are selected in synchronization with the clock signal shown in FIG. 30(a) similarly to the third embodiment, and the gate voltage of the transistors corresponding to the selected lines (Lx) (refer to FIG. 30(e)) are turned on.

The column shift circuit 74 is previously cleared in response to the clear signal 76 shown in FIG. 30(b), and then the serial data a 77 is, as the initial value, activated for one clock of the clock signal 17 so as to be supplied. Then, the column selection signals Ca1, Ca2... Can for turning on the gate voltage of the column selection transistor 71 are sequentially outputted in response to the clock signal 17, so that each column is scanned (refer to FIG. 30(d)).

When the gate voltage of the cell selection transistor 72 is turned on, an electric current which is in proportion to the charge stored in the cell flow from the source to the drain. Furthermore, electric currents flow from all of the turned on cell selection transistors to the drain of the column selection transistor 71 so as to be added. Then, the result of the addition is converted into voltage by the current-to-voltage converter 75 so as to be sequentially outputted as the CMDOUTa signal 80.

By repeating the aforesaid operation, the addition signal for the column are sequentially scanned. Therefore, by activating the CMD reset signal 19 shown in FIG. 30(f) after one scanning operation has been completed, the line corresponding to the selected line (Lx) is made to be voltage which corresponds to the reset level. Hence, the charge stored in each cell is discharged.

Figure 31:
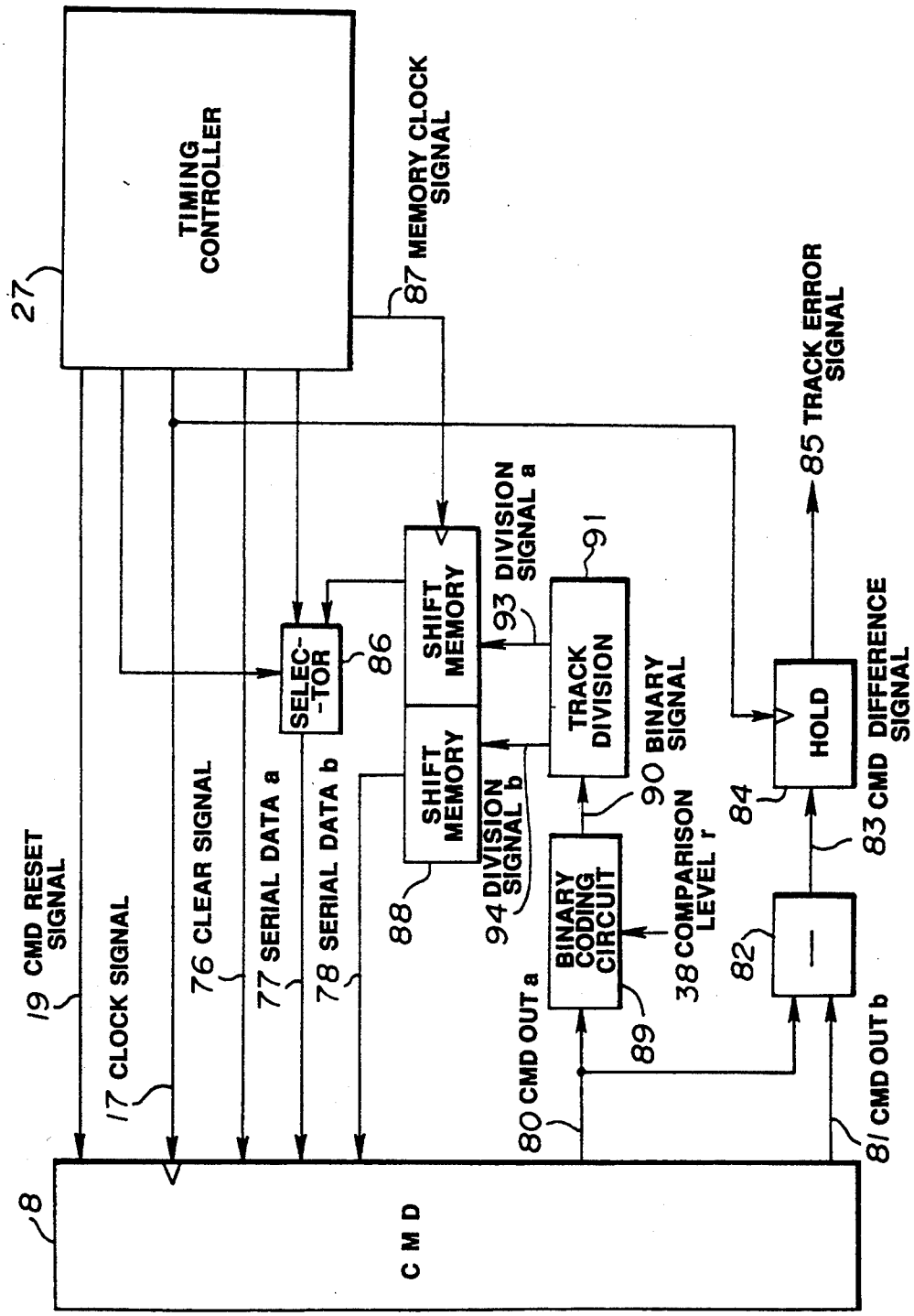
FIG. 31 is a block diagram which illustrates the structure of an essential portion of the sixth embodiment.

Then, the structure and the operation of a circuit for generating the serial data a 77 and b 78 from the CMDOUTa signal 80 obtained by the scanning of the CMD sensor 8 will now be described with reference to FIGS. 31 to 33.

The portion for generating the track error signal 85 has similar structure as that of the fifth embodiment. In addition to the structure of the fifth embodiment, a binary coding circuit 89 for binary-coding the CMDOUTa signal 80, a track division circuit 91 for dividing the position of the guide track obtained by the binary coding circuit 89 into two portions, a shift memory 88 for storing the output from the track division circuit 91, and a selector 86 for changing over the initial value from the timing controller 27 and output from the shift memory 88 so as to output the result as the serial data a 77.

First, the timing controller 27 activates, as the initial value, the serial data a 77 for one clock of the clock signal 17 via the selector 8b at the time of the insertion of the optical card. Then, the CMD sensor 8 is sequentially scanned in response to the clock signal 17 as described above. The output made due to scanning is, as the CMDOUTa signal 80, outputted from the CMD sensor 8.

FIGS. 32 and 33 illustrates the waveforms of the elements in the operational state when the serial data a 77 and b 78 are obtained from the CMDOUTa signal 80. The CMDOUTa signal 80 (refer to FIG. 32(c)) is binary-coded by the binary coding circuit 89, so that a binary signal 90 which is a signal corresponding to the position of the guide track and shown in FIG. 32(d) is obtained. The binary signal 90 is, by a track division circuit 91, divided into division signals a 93 b 94 (refer to FIGS. 32(e) and (f)) indicating the positions of the bisectioned guide track portion. The aforesaid signals are temporarily stored in the shift memory 88.

After the scanning operation has been completed, the timing controller 27 outputs a memory clock signal 87 to a shift memory 88. In response to the memory clock signal 87, data stored in the shift memory 88 is, as shown in FIG. 33, sequentially outputted to the CMD sensor 8 as the serial data a 77 and b 78.

As a-result of the aforesaid operation, the continued and adjacent regions of the CMD sensor 8 are selected and set. Then, similarly to the fifth embodiment, the selected regions are added and scanned, and the difference between the addition outputs of the two regions is calculated by the subtractor 82 and the holding circuit 84 before the difference is held at a predetermined interval. As a result, the track error signal is generated.

Thus, since the sixth embodiment is arranged in such a manner that the position of the guide track is detected and the cell column of the CMD sensor to be scanned is selected in accordance with the detected position, the track error signal can be correctly generated even if the interval of the guide tracks where a spot is formed by the CMD sensor is deviated due to irregularity of the tracks of the optical card or that of the magnification of the optical system.

Therefore, a track error signal, which cannot be affected by uneven distributed track intervals on the medium or irregularity of the magnification of the optical system as well as dust on the medium and a defect such as a flaw, can be generated. Hence, stable tracking servo can be performed.

According to the present invention, it is apparent that working modes different in a wide range can be formed on the basis of this invention without departing from the spirit and the scope of the invention. This invention is restricted to appended claims but not limited to its particular working modes.

What is claimed is:

1. An optical information recording/reproducing apparatus for performing tracking servo and at least one of recording and reproducing information by irradiating a recording medium having a plurality of guide tracks and a plurality of information tracks with a light spot and by generating a track error signal from reflected light of the light spot, said optical information recording/reproducing apparatus comprising:

photo-detecting means having a detection portion composed of a plurality of light receiving portions which directly abut each other and are disposed in a two-dimensional array, said detection portion receiving a formed spot of light reflected by said recording medium so as to output a signal;

addition means for selecting a region having an arrangement of said plurality of light receiving portions directly abutting each other and in a line or column direction in said detection portion of said photo-detecting means and for adding together outputs from said arrangement of light receiving portions in the selected regions;

binary coding means for binary-coding output from said addition means;

address detection means for detecting the position of an address which corresponds to the position of at least one guide track on the basis of output from said binary cording means;

track error generating means for generating a track error signal on the basis of output from said address detection means;

address output means for outputting the address-position of selected regions having said arrangement of said light receiving portions; and average value calculating means for averaging the address positions outputted from said address output means when output from said binary coding means is being activated.

2. An optical information recording/reproducing apparatus for performing tracking servo and at least one of recording and reproducing information by irradiating a recording medium having a plurality of guide tracks and a plurality of information tracks with a light spot and by generating a track error signal from reflected light of the light spot, said optical information recording/reproducing apparatus comprising:

photo-detecting means having a detection portion composed of a plurality of light receiving portions which directly abut each other and are disposed in a two-dimensional array, said detection portion receiving a formed spot of light reflected by said recording medium so as to output a signal;

addition means for selecting a plurality of regions having arrangements of said plurality of light receiving portions directly abutting each other and in a line or column direction in said detection portion of said photo-detecting means, and for adding together outputs from selected regions disposed at predetermined intervals within said arrangement of lights receiving portions;

binary coding means for binary-coding output from said addition means;

address detection means for detecting the position of an address which corresponds to the position of said guide tracks, on the basis of output from said binary coding means;

track error generating means for generating a track error signal on the basis of output from said address detection means;

address output means for outputting the address-position of selected regions having said arrangement of said light receiving portions; and average value calculating means for averaging the address positions outputted from said address output means when output from said binary coding means is being activated.

3. An optical information recording/reproducing apparatus according to claim 1, wherein said addition means outputs addition by adding together outputs from said arrangement of said light receiving portion in said selected region, and by sequentially scanning said addition in a direction perpendicular to said arrangement.

4. An optical information recording/reproducing apparatus according to claim 1, wherein said address detection means includes holding means for holding address positions of output from said average value calculating means for one scanning period of said addition means.

5. An optical information recording/reproducing apparatus according to claim 2, wherein said addition means outputs addition by adding together outputs from said arrangement of said light receiving portions in a plurality of selected regions disposed at intervals which are integer multiples of the track interval and by sequentially scanning said addition in a direction perpendicular to said arrangement.

6. An optical information recording/reproducing apparatus according to claim 2, wherein said address detection means includes address output means for outputting the address position of a region having said arrangement of said light receiving portions;

average value calculating means for averaging address positions outputted from said address output means when output from said binary coding means is being activated; and holding means for holding address positions of output from said average value calculating means for one scanning period of said addition means, and said track error generating means generates a track error signal by subtracting a number of addresses which corresponds to half of the track interval from each address position of output from said holding means.

7. An optical information recording/reproducing apparatus according to claim 1 further comprising setting means for setting a window signal which indicates a region of said light receiving portion including one of said plurality of guide tracks, wherein said address detection means detects address positions which correspond to one of said plurality of guide tracks, on the basis of output from said binary coding means and said setting means.

8. An optical information recording/reproducing apparatus according to claim 7, wherein said setting means includes window generating means for outputting window signals indicating address positions which correspond to a predetermined range which includes the position of said guide track, and said address detection means includes gate signal output means for outputting, as a gate signal, the logical sum of said window signals outputted from said window generating means and the output from said binary coding means, address output means for outputting address positions of regions having said arrangement of said light receiving portions, average value calculating means for averaging address positions outputted from said address output means when said gate signal is being activated, and holding means for holding address positions of output from said average value calculating means for one scanning period of said addition means.

9. An optical information recording/reproducing apparatus according to claim 8, wherein said setting-means outputs a signal in the next scanning period as said window signal which is based on the output of said address output means and said holding means, and which is active at address position corresponding to a predetermined range centering around the output of said holding means.

10. An optical information recording/reproducing apparatus according to claim 1 further comprising:

maximum value detection means for detecting the maximum value of output from said addition means;

minimum value detection means for detecting the minimum value of output from said addition means; and binary coding level setting means for setting the binary coding level of said binary coding means on the basis of said detected maximum and minimum values.

11. An optical information recording/reproducing apparatus according to claim 1, wherein said binary coding means includes comparison means for comparing output from said addition means and a predetermined comparison level, said comparison level being set to an intermediate level between the level of said guide track and the level of said information track from the levels of outputs from said addition means.

12. An optical information recording/reproducing apparatus for performing tracking servo and at least one of recording and reproducing information by irradiating a recording medium having a plurality of guide tracks and a plurality of information tracks with a light spot and by generating a track error signal from reflected light of the light spot, said optical information recording/reproducing apparatus comprising:

photo-detecting means having a detection portion composed of a plurality of light receiving portions which directly abut each other and are disposed in a two-dimensional array, said detection portion receiving a spot of light reflected by said recording medium so as to output a signal;

region selection means for selecting a plurality of first regions having an arrangement of said plurality of light receiving portions directly abutting each other in a line or column direction in said detection portion of said photo-detecting means and a plurality of second regions having an arrangement of said plurality of said light receiving portions directly abutting each other in the same direction as that of said first regions adjacent to said first regions;

subtracting means for subtracting outputs from said first regions selected by said region selection means and outputs from said second regions; and track error generating means for generating a track error signal on the basis of the output from said subtracting means, wherein said subtracting means includes:

addition means for outputting addition in said first regions and said second regions, respectively, by adding together outputs from said arrangement of said plurality of light receiving portions in said selected regions disposed at intervals which are integer multiples of a track interval, and by sequentially scanning said addition in a direction perpendicular to said arrangement, and detects the difference between the outputs from said two regions by subtracting the addition outputs from said first regions and addition outputs from said second regions.

13. An optical information recording/reproducing apparatus according to claim 12, wherein a region formed by adding said first regions and said second regions selected by said region selection means includes an address position of said photo-detecting means which corresponds to the position of said guide track, said guide track position having a continuous range.

14. An optical information recording/reproducing apparatus according to claim 12, wherein said track error generating means includes holding means for holding the output from said subtracting means at predetermined intervals, and outputs the output from said holding means as a track error signal.

15. An optical information recording/reproducing apparatus according to claim 12 further comprising guide track position detection means for detecting the position of said guide track, wherein said region selection mean selects said first regions and said second regions on the basis of the guide track position detected by said guide track position detection means.

16. An optical information recording/reproducing apparatus according to claim 1, wherein said region selection means includes region division means for dividing the address position, which corresponds to the guide track position detected by said guide track position detection means, into two regions having the same area, and selects said two divided regions as said first and second regions.

17. An optical information recording/reproducing apparatus according to claim 1, wherein said photo-detecting means is composed of a CMD (Charge Modulation Device).

18. An optical information recording/reproducing apparatus according to claim 1, wherein said photo-detecting means sets a storage period for storing charge and a scanning period for scanning in detecting a formed spot of light reflected by said recording medium, said photo-detecting means lights said spot in said storage period and turns off said spot in said scanning period so as to obtain a light receiving output.

* * * * *